United States Patent
Jiang et al.

(10) Patent No.: US 9,036,901 B2
(45) Date of Patent: May 19, 2015

(54) METHOD OF COLOR CORRECTION OF PAIR OF COLORFUL STEREO MICROSCOPE IMAGES

(71) Applicant: Ningbo University, Ningbo, Zhejiang (CN)

(72) Inventors: Gangyi Jiang, Zhejiang (CN); Xiangjun Liu, Zhejiang (CN); Mei Yu, Zhejiang (CN); Feng Shao, Zhejiang (CN); Zongju Peng, Zhejiang (CN); Yigang Wang, Zhejiang (CN)

(73) Assignee: Ningbo University, Ningbo, Zhejiang Province (CN)

( * ) Notice: Subject to any disclaimer, the term of this patent is extended or adjusted under 35 U.S.C. 154(b) by 78 days.

(21) Appl. No.: 14/030,948

(22) Filed: Sep. 18, 2013

(65) Prior Publication Data

US 2014/0169661 A1    Jun. 19, 2014

(30) Foreign Application Priority Data

Sep. 21, 2012  (CN) .......................... 2012 1 0353589

(51) Int. Cl.
| | |
|---|---|
| *G06K 9/00* | (2006.01) |
| *G06K 9/62* | (2006.01) |
| *G06T 5/40* | (2006.01) |
| *G06T 5/50* | (2006.01) |
| *G06T 7/40* | (2006.01) |

(52) U.S. Cl.
CPC ............... *G06K 9/6212* (2013.01); *G06T 5/40* (2013.01); *G06T 5/50* (2013.01); *G06T 7/408* (2013.01); *G06T 2207/10012* (2013.01); *G06T 2207/10024* (2013.01); *G06T 2207/10056* (2013.01)

(58) Field of Classification Search
None
See application file for complete search history.

(56) References Cited

PUBLICATIONS

Qi Wang, Xi Sun, and Zengfu Wang. 2009. A robust algorithm for color correction between two stereo images. In Proceedings of the 9th Asian conference on Computer Vision—vol. Part II (ACCV'09), Hongbin Zha, Rin-ichiro Taniguchi, and Stephen Maybank (Eds.), vol. Part II. Springer-Verlag, Berlin, Heidelberg, 405-416. DOI=10.1007/978-3-642-12304-7_.*

* cited by examiner

*Primary Examiner* — Samir Ahmed
*Assistant Examiner* — Menatoallah Youssef

(57) ABSTRACT

A method for color correction of a pair of colorful stereo microscope images is provided, which transmits the color information of the foreground areas and the background area of the reference image to the aberrated image separately for avoiding transmission error of the color information of the varied areas of the pair of the images, thus sufficiently improves the accuracy of the color correction, reduces the difference between the color of the reference image and the color of the aberrated image, and well prepares for the stereo matching of the pair of colorful stereo microscope images as well as for the three-dimensional reconstruction and three-dimensional measurement; on the other hand, during the correction, the correcting procedure is provided automatically without manual work.

17 Claims, 3 Drawing Sheets

METHOD OF COLOR CORRECTION OF PAIR OF COLORFUL STEREO MICROSCOPE IMAGES

BACKGROUND OF THE PRESENT INVENTION

1. Field of Invention

The present invention relates to a technology for processing a microscope image, and more particularly to a method for color correction of a pair of colorful stereo microscope images.

2. Description of Related Arts

In an image acquisition procedure of a stereo microscope, since there are some differences between sensors of a left channel and a right channel of CMOS (Complementary Metal Oxide Semiconductor), a pair of colorful stereo microscope images acquired may have a great color difference. The color difference between the pair of colorful stereo microscope images will affect accuracy of stereo matching. If the color difference is obvious, disparity information of the pair of colorful stereo microscope images can not be obtained accurately, and without the accurate disparity information, a three-dimensional reconstruction can not be successfully completed, and then a three-dimensional measurement is directly affected. Therefore, in order to eliminate the color difference between the pair of colorful stereo microscope images, it is necessary to add intelligent image processing after machine imaging for correcting the color of aberrated images.

A core of eliminating the color difference is how to transmit color information of a reference image to the aberrated images in such a manner that the colors of the two images basically agree with each other.

At present, the method based on color transfer for correcting the colors is mainly based on globally linear color transfer, comprising steps of: transforming color space, wherein RGB color space with strong correlation is transformed into $l\alpha\beta$ color space with weak correlation; correcting the colors of the aberrated images in the $l\alpha\beta$ color space by utilizing variances of the reference image and the aberrated image, wherein color values of a l color channel, an $\alpha$ color channel and a $\beta$ color channel of each pixel of the corrected image are denoted respectively as l", $\alpha$" and $\beta$", wherein $$l'' = \frac{\delta_t^{l'}}{\delta_s^{l'}} l^*,$$

$$\alpha'' = \frac{\delta_t^{\alpha'}}{\delta_s^{\alpha'}} \alpha^*,$$

$$\beta'' = \frac{\delta_t^{\beta'}}{\delta_s^{\beta'}} \beta^*,$$

wherein $l^* = l' - \bar{l}'$, $\alpha^* = \alpha' - \bar{\alpha}'$ and $\beta^* = \beta' - \bar{\beta}'$, the color values of the l color channel, the $\alpha$ color channel and the $\beta$ color channel of each pixel of the aberrated image are denoted respectively as l', $\alpha$' and $\beta$', average color values of the l color channel, the $\alpha$ color channel and the $\beta$ color channel of each pixel of the aberrated image are denoted respectively as $\bar{l}'$, $\bar{\alpha}'$ and $\bar{\beta}'$, the variances of the color values of the l color channel, the $\alpha$ color channel and the $\beta$ color channel of each pixel of the aberrated image are denoted respectively as $\delta_t^{l'}$, $\delta_t^{\alpha'}$ and $\delta_t^{\beta'}$, the variances of the color values of the l color channel, the $\alpha$ color channel and the $\beta$ color channel of each pixel of the reference image are denoted respectively as $\delta_s^{l'}$, $\delta_s^{\alpha'}$ and $\delta_s^{\beta'}$. The method for color correction has two main problems that: on one hand, the method is based on globally linear color transfer for color correction, wherein it is not considered that an object area can be separated out from a background area, and the color information of the whole image is evenly transmitted, which may lead to a transmission error of the color information of the object area and the background area in such a manner that accuracy of color correction is decreased; on the other hand, the method is designed for the images and video sequences of natural scenes, and the microscope images are greatly different from the images of the natural scenes, wherein the microscope images need higher accuracy in processing, and the method for color correction can not adapt to a high accuracy requirement of the microscope images.

SUMMARY OF THE PRESENT INVENTION

An object of the present invention is to provide a method for color correction of a colorful stereo microscope image, wherein accuracy of color correction is high enough for correcting colors of the microscope image.

Accordingly, in order to accomplish the above objects, the present invention provides the method for color correction of a pair of colorful stereo microscope images comprising steps of:

a) taking a first image of a pair of the colorful stereo microscope images in the RGB color space as a reference image $I^{ref}$, and taking a second image of the pair of the colorful stereo microscope images in the RGB color space as an uncorrected image $I^{sou}$;

b) obtaining a first saliency map of the reference image $I^{ref}$ and a second saliency map of the uncorrected image $I^{sou}$, wherein the first saliency map is marked as SaliencyMap$^{ref}$ and the second saliency map is marked as SaliencyMap$^{sou}$; obtaining a first segmentation map of the reference image $I^{ref}$ and a second segmentation map of the uncorrected image $I^{sou}$ with the first saliency map of the reference image $I^{ref}$ and the second saliency map of the uncorrected image $I^{sou}$ respectively, wherein the first segmentation map is marked as BMap$^{ref}$ and the second segmentation map is marked as BMap$^{sou}$, wherein the BMap$^{ref}$ and the BMap$^{sou}$ all comprise a plurality of foreground areas, the i'th foreground area of the BMap$^{ref}$ is marked as BMap$_i^{ref}$, and the i'th foreground area of the BMap$^{sou}$ is marked as BMap$_i^{sou}$, wherein, 1≤i'≤I', the I' is the number of the foreground areas of the BMap$^{ref}$ or the BMap$^{sou}$;

c) calculating histograms, normalized histograms and cumulative histograms of a luminance component Y, a first chroma component Cb and a second chroma component Cr for each the foreground area of the BMap$^{ref}$ in the YCbCr color space, and calculating the histograms, the normalized histograms and the cumulative histograms of the luminance component Y, the first chroma component Cb and the second chroma component Cr for each the foreground area of the BMap$^{sou}$ in the YCbCr color space;

d) calculating color histograms for each the foreground area of the BMap$^{ref}$ and the BMap$^{sou}$ in the RGB color space;

e) for each the foreground area of the BMap$^{ref}$, calculating a similarity value of the color histogram of the foreground area of the BMap$^{ref}$ and the color histogram of the corresponding foreground area of the BMap$^{sou}$, and judging whether the foreground area of the BMap$^{ref}$ is marching with the corresponding foreground area of the BMap$^{sou}$ or not from the similarity value of the color histograms of the two marching foreground areas;

f) for each pair of the foreground area of the BMap$^{ref}$ and the marched foreground area of the BMap$^{sou}$, calculating transfer functions with respect to a luminance component Y, a first chroma component Cb and a second chroma component Cr of the pair, and correcting the luminance component Y, the first chroma component Cb and the second chroma component Cr of the area of the uncorrected image $I^{sou}$ corresponding to the marched foreground area of the BMap$^{sou}$ according to the transfer functions with respect to the luminance component, the first chroma component and the second chroma component of the foreground area of the BMap$^{ref}$ and the marched foreground area of the BMap$^{sou}$;

g) calculating the histograms, the normalized histograms and the cumulative histograms of the luminance component Y, the first chroma component Cb and the second chroma component Cr of the background area of the BMap$^{ref}$ in the YCbCr color space, and calculating the histograms, the normalized histograms and the cumulative histograms of the luminance component Y, the first chroma component Cb and the second chroma component Cr of the background area of the BMap$^{sou}$ in the YCbCr color space;

h) calculating transfer functions with respect to the luminance component, the first chroma component and the second chroma component of the background area of the BMap$^{ref}$ and the background area of the BMap$^{sou}$, and correcting the luminance component Y, the first chroma component Cb and the second chroma component Cr of the area of the uncorrected image $I^{sou}$ corresponding to the background area of the BMap$^{sou}$ according to the transfer functions with respect to the luminance component, the first chroma component and the second chroma component of the background areas of the BMap$^{ref}$ and the BMap$^{sou}$; and i) combining the luminance component, the first chroma component and the second chroma component of each corrected area of the uncorrected image for obtaining an corrected image.

For obtaining the first saliency map of the reference image $I^{ref}$ and the second saliency map of the uncorrected image $I^{sou}$, the step b) specifically comprises steps of:

b-a1) respectively re-quantifying color values of a R, a G and a B channel of the reference image $I^{ref}$ into M levels for obtaining an initial quantified image corresponding to the reference image $I^{ref}$, wherein the initial quantified image has $M^3$ kinds of color;

b-a2) calculating an occurrence probability of each the color of the initial quantified image for obtaining the color histogram thereof, marking the occurrence probability of the ith color $C_i$ as $P_i$, wherein, $1 \le i \le M^3$;

b-a3) replacing the color whose the occurrence probability is lower than a constant threshold T with the next color in the color histogram of the initial quantified image for obtaining a final quantified image corresponding to the reference image $I^{ref}$, wherein the final quantified image has L kinds of color, wherein for the ith color $C_i$ in the initial quantified image, judging whether $P_i<T$ or not, if yes, replacing the ith color $C_i$ in the initial quantified image with the i+1th color $C_{i+1}$ or the i−1th color $C_{i-1}$ next to the $C_i$ in the color histogram, if no, keeping the ith color $C_i$ in the initial quantified image, wherein $L \le M^3$;

b-a4) calculating a saliency value of each the color of the final quantified image for obtaining the first saliency map of the reference image $I^{ref}$, marking the first saliency map as SaliencyMap$^{ref}$, the values of which are the saliency value, and marking the saliency value of the kth color $C_k'$ of the final quantified image as Sal($C_k'$), $$Sal(C_k') = \sum_{C_j' \in I_q} f(C_j') \times D(C_k', C_j'),$$

wherein $1 \le k \le L$, $1 \le j \le L$, $C_j'$ is the jth color of the final quantified image, $I_q$ is all the colors of the final quantified image, $f(C_j')$ is the occurrence probability of the $C_j'$ in the final quantified image, $D(C_k',C_j')$ is a distance between the $C_k'$ and the $C_j'$ in the $l\alpha\beta$ color space after the $C_k'$ and the $C_j'$ are transformed to the $l\alpha\beta$ color space; and b-a5) obtaining the SaliencyMap$^{sou}$ of the uncorrected image $I^{sou}$ by the same method as recited in the step b-a1) to the step b-a4) for obtaining the SaliencyMap$^{ref}$ of the reference image $I^{ref}$;

wherein in the step b-a1), M=12, the constant threshold T in the step b-a3) is 0.05 times of the number of the pixels of the reference image $I^{ref}$ or the uncorrected image $I^{sou}$.

For obtaining the first segmentation map of the reference image $I^{ref}$ and the second segmentation map of the uncorrected image $I^{sou}$, the step b) specifically comprises steps of:

b-c1) defining a constant threshold $T_f$, and thresholding the SaliencyMap$^{ref}$ of the reference image $I^{ref}$ by utilizing the constant threshold $T_f$ for obtaining a binary image thereof, wherein the binary image is marked as B$^{ref}$, wherein $T_f \in [0, 255]$, and the value 255 of the B$^{ref}$ marks the foreground area, and the value 0 of the B$^{ref}$ marks the background area;

b-c2) obtaining a plurality of initial foreground areas and initial background areas of the reference image $I^{ref}$ by utilizing a pixel value of each the pixel in the B$^{ref}$, wherein each the pixel in the initial foreground areas of the reference image $I^{ref}$ is corresponding to the pixel with the pixel value of 255 in the B$^{ref}$, each the pixel in the initial background areas of the reference image $I^{ref}$ is corresponding to the pixel with the pixel value of 0 in the B$^{ref}$;

b-c3) taking the ith initial foreground area of the $I^{ref}$ under treating as a present foreground area Trimap$_i$, wherein, $1 \le i \le I$, I is the number of the initial foreground areas of the reference image $I^{ref}$;

b-c4) denoting an area of B$^{ref}$ corresponding to the Trimap$_i$ as B$_i^{ref}$, marking a min X axis position, a max X axis position, a min Y axis position and a max Y axis position of the pixels in the area B$_i^{ref}$ as miX$_i$, maX$_i$, miY$_i$ and maY$_i$;

b-c5) enlarging the B$_i^{ref}$ to a rectangle area, marking the rectangle area as B$_i^{refi}$, and marking the min X axis position, the max X axis position, the min Y axis position and the max Y axis position of the pixels in the B$_i^{refi}$ as miX$_i'$, maX$_i'$, miY$_i'$, and maY$_i'$, wherein $$miX_i' = \begin{cases} miX_i - 0.5 \times (maX_i - miX_i), & \text{if } miX_i - 0.5 \times (maX_i - miX_i) \ge 0 \\ 0, & \text{if } miX_i - 0.5 \times (maX_i - miX_i) < 0, \end{cases}$$

$$maX_i' = \begin{cases} maX_i + 0.5 \times (maX_i - miX_i), & \text{if } maX_i + 0.5 \times (maX_i - miX_i) < W \\ W - 1, & \text{if } maX_i + 0.5 \times (maX_i - miX_i) \ge W, \end{cases}$$

$$miY_i' = \begin{cases} miY_i - 0.5 \times (maY_i - miY_i), & \text{if } miY_i - 0.5 \times (maY_i - miY_i) \ge 0 \\ 0, & \text{if } miY_i - 0.5 \times (maY_i - miY_i) < 0, \end{cases}$$

$$maY_i' = \begin{cases} maY_i + 0.5 \times (maY_i - miY_i), & \text{if } maY_i + 0.5 \times (maY_i - miY_i) < H \\ H - 1, & \text{if } maY_i + 0.5 \times (maY_i - miY_i) \ge H, \end{cases}$$

wherein the W is a width of the B$^{ref}$, the H is a height of the B$^{ref}$;

b-c6) enlarging the present foreground area $Trimap_i$ to the rectangle area with the same position as the $B_i^{refi}$, wherein the area is marked as $Trimap_i'$; for each pixel in the $Trimap_i'$, judging whether the pixel in the $Trimap_i'$ belongs to the foreground area or the background area according to the pixel value of the corresponding pixel in the $B_i^{refi}$, wherein for the pixel having the position of (x,y) in the $Trimap_i'$, judging whether the pixel value of the pixel having the position of (x,y) in the $B_i^{refi}$ is 255 or not, if yes, the pixel having the position of (x,y) in the $Trimap_i'$ belongs to the foreground area, if no, the pixel having the position of (x,y) in the $Trimap_i'$ belongs to the background area, wherein, $0 \leq x \leq W_i$, $0 \leq y \leq H_i$, the $W_i$ is a width of the $B_i^{refi}$ and the $Trimap_i'$, $W_i = maX_i' - miX_i'$, the $H_i$ is a height of the $B_i^{refi}$ and the $Trimap_i'$, $H_i = maY_i' - miY_i'$;

b-c7) letting $miX_z = miX_i'$, $maX_z = maX_i'$, $miY_z = miY_i'$ and $maY_z = maY_i'$, and taking the $B_i^{refi}$ as the new untreated rectangle area $B_i^{ref}$, taking the $Trimap_i'$ as the new present foreground area $Trimap_i$, repeating the step b-c5) to the step b-c7) again and circularly, judging whether the number of the pixels in the foreground area of the $Trimap_i'$ after repeating K times is equal to the number of the pixels in the foreground of the $Trimap_i'$ after repeating K−1 times, if yes, segmenting the $Trimap_i'$ with a GrabCut method for obtaining a final foreground area and a final background area of the $Trimap_i'$, if no, repeating the step b-c5) to the step b-c7) again, wherein the "=" is an assignment symbol, an initial value of the K is 1;

b-c8) letting i=i+1, wherein the "=" is the assignment symbol, taking the next untreated initial foreground area of the reference image $I^{ref}$ as the present foreground area $Trimap_i$, repeating the step b-c4) to the step b-c8) again and circularly until all the initial foreground areas of the reference image $I^{ref}$ are treated for obtaining the first segmentation map $BMap^{ref}$ of the reference image $I^{ref}$, marking the i'th foreground area of the $BMap^{ref}$ as $BMap_{i'}^{refi}$, $1 \leq i' \leq I'$, wherein the I' is the number of the foreground areas of the $BMap^{ref}$; and b-c9) obtaining the $BMap^{sou}$ of the uncorrected image $I^{sou}$ by the same method as recited in the step b-c1) to the step b-c8) for obtaining the $BMap^{ref}$ of the reference image $I^{ref}$, marking the i'th foreground area of the $BMap^{sou}$ as $BMap_{i'}^{sou}$, wherein, $1 \leq i' \leq I'$, the I' is the number of the foreground areas of the $BMap^{sou}$.

Wherein when obtaining the first segmentation map $BMap^{ref}$ of the reference image $I^{ref}$, the constant threshold $T_f$ in the step b-c1) is 2 times of the average pixel value of all the pixels of the $SaliencyMap^{ref}$ of the reference image $I^{ref}$, when obtaining the second segmentation map $BMap^{sou}$ of the uncorrected image $I^{sou}$, the constant threshold $T_f$ in the step corresponding to step b-c1) is 2 times of the average pixel value of all the pixels of the $SaliencyMap^{sou}$ of the uncorrected image $I^{sou}$; in the step b-c7), K=4.

The step c) specifically comprises steps of:

c-1) taking the i'th foreground area $BMap_{i'}^{refi}$ under treating of the $BMap^{ref}$ as the present foreground area, wherein, $1 \leq i' \leq I'$, the I' is the number of the foreground areas of the $BMap^{ref}$;

c-2) calculating the histograms of the luminance component Y, the first chroma component Cb and the second chroma component Cr of the $BMap_{i'}^{refi}$: denoting the histogram of the luminance component Y of the $BMap_{i'}^{refi}$ as $H_{i'}^{Y\_ref}(u)$, $$H_{i'}^{Y\_ref}(u) = \sum_{(x',y') \in BMap_{i'}^{ref}} \delta[u, Y(x', y')],$$

wherein Y(x',y') is the value of the luminance component of the pixel at the position of (x',y') in the $BMap_{i'}^{refi}$, $$\delta[u, Y(x', y')] = \begin{cases} 1, & \text{if } u = Y(x', y') \\ 0, & \text{if } u \neq Y(x', y'), \end{cases}$$

denoting the histogram of the first chroma component Cb of the $BMap_{i'}^{refi}$ as $H_{i'}^{Cb\_ref}(u)$, $$H_{i'}^{Cb\_ref}(u) = \sum_{(x',y') \in BMap_{i'}^{ref}} \delta[u, Cb(x', y')],$$

wherein Cb(x',y') is the value of the first chroma component of the pixel at the position of (x',y') in the $BMap_{i'}^{refi}$, $$\delta[u, Cb(x', y')] = \begin{cases} 1, & \text{if } u = Cb(x', y') \\ 0, & \text{if } u \neq Cb(x', y'), \end{cases}$$

denoting the histogram of the second chroma component Cr of the $BMap_{i'}^{refi}$ as $H_{i'}^{Cr\_ref}(u)$, $$H_{i'}^{Cr\_ref}(u) = \sum_{(x',y') \in BMap_{i'}^{ref}} \delta[u, Cr(x', y')],$$

wherein Cb(x',y') is the value of the second chroma component of the pixel at the position of (x',y') in the $BMap_{i'}^{refi}$, $$\delta[u, Cr(x', y')] = \begin{cases} 1, & \text{if } u = Cr(x', y') \\ 0, & \text{if } u \neq Cr(x', y'), \end{cases}$$

wherein $u \in [0, 255]$;

c-3) calculating the normalized histograms of the luminance component Y, the first chroma component Cb and the second chroma component Cr of the $BMap_{i'}^{refi}$: denoting the normalized histogram of the luminance component Y of the $BMap_{i'}^{refi}$ as $H_{i'}^{Y\_Norm\_ref}(u)$, $H_{i'}^{Y\_Norm\_ref}(u) = H_{i'}^{Y\_ref}(u)/PixelCount_{i'}$, denoting the normalized histogram of the first chroma component Cb of the $BMap_{i'}^{refi}$ as $H_{i'}^{Cb\_Norm\_ref}(u)$, $H_{i'}^{Cb\_Norm\_ref}(u) = H_{i'}^{Cb\_ref}(u)/PixelCount_{i'}$, denoting the normalized histogram of the second chroma component Cr of the $BMap_{i'}^{refi}$ as $H_{i'}^{Cr\_Norm\_ref}(u)$, $H_{i'}^{Cr\_Norm\_ref}(u) = H_{i'}^{Cr\_ref}(u)/PixelCount_{i'}$, wherein $u \in [0, 255]$, and the $PixelCount_{i'}$ is the number of the pixels in the present foreground area $BMap_{i'}^{refi}$;

c-4) calculating the cumulative histograms of the luminance component Y, the first chroma component Cb and the second chroma component Cr of the $BMap_{i'}^{refi}$: denoting the cumulative histogram of the luminance component Y of the $BMap_{i'}^{refi}$ as $H_{i'}^{Y\_Cum\_ref}(u)$, $$H_{i'}^{Y\_Cum\_ref}(u) = \sum_{j=0}^{u} H_{i'}^{Y\_Norm\_ref}(j),$$

denoting the cumulative histogram of the first chroma component Cb of the $BMap_{i'}^{refi}$ as $H_{i'}^{Cb\_Cum\_ref}(u)$, $$H_{i'}^{Cb\_Cum\_ref}(u) = \sum_{j=0}^{u} H_{i'}^{Cb\_Norm\_ref}(j),$$

denoting the cumulative histogram of the second chroma component Cr of the $BMap_{i'}^{refi}$ as $H_{i'}^{Cr\_Cum\_ref}(u)$, $$H_{i'}^{Cr\_Cum\_ref}(u) = \sum_{j=0}^{u} H_{i'}^{Cr\_Norm\_ref}(j),$$

wherein $u \in [0,255]$;

c-5) letting i'=i'+1, taking the next untreated foreground area of the $BMap^{ref}$ as the present foreground area, repeating the step c-2) to the step c-5) again and circularly until all the foreground areas of the $BMap^{ref}$ are treated, wherein the "=" is the assignment symbol; and c-6) calculating the histograms, the normalized histograms and the cumulative histograms of the luminance component Y, the first chroma component Cb and the second chroma component Cr of each the foreground area of the $BMap^{sou}$ by the same method as recited in the step c-1) to the step c-5).

The step d) specifically comprises steps of:

d-a1) taking the i'th foreground area $BMap_{i'}^{refi}$ under treating of the $BMap^{ref}$ as the present foreground area, wherein, $1 \leq i' \leq I'$, the I' is the number of the foreground areas of the $BMap^{ref}$;

d-a2) calculating the color histogram of the present foreground area $BMap_{i'}^{refi}$: denoting the color histogram as $H_{i'}^{RGB\_ref}(c)$, $$H_{i'}^{RGB\_ref}(c) = \sum_{(x',y') \in BMap_{i'}^{ref}} \delta[c, C(x', y')] / PixelCount_{i'}^{RGB\_ref},$$

wherein $C=256 \times R + 16 \times G + B$, the R is the value of a red component of the pixel in the $BMap_{i'}^{refi}$, the G is the value of a green component of the pixel in the $BMap_{i'}^{refi}$, the B is the value of a blue component of the pixel in the $BMap_{i'}^{refi}$, wherein $C(x',y')$ is the value of the C of the pixel at the position of $(x',y')$ in the $BMap_{i'}^{refi}$, $$\delta[c, C(x', y')] = \begin{cases} 1, & \text{if } c = C(x', y') \\ 0, & \text{if } c \neq C(x', y'), \end{cases}$$

$PixelCount_{i'}^{RGB\_ref}$ is the number of the pixels in the present foreground area $BMap_{i'}^{refi}$;

d-a3) letting i'=i'+1, taking the next untreated foreground area of the $BMap^{ref}$ as the present foreground area, repeating the step d-a2) to the step d-a3) again and circularly until all the foreground areas of the $BMap^{ref}$ are treated, wherein the "=" is the assignment symbol; and d-a4) calculating the color histogram $H_{i'}^{RGB\_sou}(c)$ of each the foreground area of the $BMap^{sou}$ by the same method as recited in the step d-a1) to the step d-a3).

The step e) specifically comprises steps of:

e-1) taking the pth foreground area $BMap_p^{refi}$ under treating of the $BMap^{ref}$ as the first present foreground area, taking the qth foreground area $BMap_q^{sou}$ under treating of the $BMap^{sou}$ as the second present foreground area, wherein, $1 \leq p \leq P$, $1 \leq q \leq Q$, the P is the number of the foreground areas of the $BMap^{ref}$, the Q is the number of the foreground areas of the $BMap^{sou}$;

e-2) calculating the similarity value of the color histogram $H_p^{RGB\_ref}(c)$ of the first foreground area $BMap_p^{refi}$ and the color histogram $H_q^{RGB\_sou}(c)$ of the second foreground area $BMap_q^{sou}$, marking the similarity value as $Sim(H_p^{RGB\_ref}, H_q^{RGB\_sou})$, $0 \leq Sim(H_p^{RGB\_ref}, H_q^{RGB\_sou}) \leq 1$, wherein the larger the value of $Sim(H_p^{RGB\_ref}, H_q^{RGB\_sou})$ is, the more similar the two color histograms are, and the value 1 of $Sim(H_p^{RGB\_ref}, H_q^{RGB\_sou})$ means that the two color histograms are same with each other;

e-3) judging whether $Sim(H_p^{RGB\_ref}, H_q^{RGB\_sou})$ is larger than a threshold $T_s$ or not, if yes, the first foreground area $BMap_p^{refi}$ is marching with the second foreground area $BMap_q^{sou}$, if no, the first foreground area $BMap_p^{refi}$ is not marching with the second foreground area $BMap_q^{sou}$; and e-4) letting p=p+1, q=q+1, wherein the "=" is the assignment symbol, taking the next untreated foreground area of the $BMap^{ref}$ as the first present foreground area, taking the next untreated foreground area of the $BMap^{sou}$ as the second present foreground area, repeating the step e-2) to the step e-4) again and circularly until all the foreground areas of the $BMap^{ref}$ or the foreground areas of the $BMap^{sou}$ are treated.

The step f) specifically comprises steps of:

f-1) taking the matched foreground areas under treating of the $BMap^{ref}$ and the $BMap^{sou}$ respectively as the first present foreground area and the second present foreground area, supposing that the first present foreground area is the p'th matched foreground area $BMap_{p'}^{refi}$ under treating of the $BMap^{ref}$, supposing that the second present foreground area is the q'th matched foreground area $BMap_{q'}^{sou}$ under treating of the $BMap^{sou}$, wherein, $1 \leq p' \leq S$, $1 \leq q' \leq S$, the S is the number of the pairs of the matched foreground areas of the $BMap^{ref}$ and the $BMap^{sou}$;

f-2) judging whether the values u' and u'+1 of the luminance component Y of the first present foreground area $BMap_{p'}^{refi}$ and the value v' of the luminance component Y of the second present foreground area $BMap_{q'}^{sou}$ satisfy a following inequality: $H_{p'}^{Y\_Cum\_ref}(u') \leq H_{q'}^{Y\_Cum\_sou}(v') < H_{p'}^{Y\_Cum\_ref}(u'+1)$ if yes, the value u' of the luminance component Y of the first present foreground area $BMap_{p'}^{refi}$ is marching with the value v' of the luminance component Y of the second present foreground area $BMap_{q'}^{sou}$, calculating a color transfer function of the value v' of the luminance component Y of the second present foreground area $BMap_{q'}^{sou}$, marking the color transfer function as $M_{q'}^{Y}(v')$, wherein $M_{q'}^{Y}(v')=u'$ and then providing a step f-4), if no, providing a step f-3), wherein $H_{p'}^{Y\_Cum\_ref}$ is the cumulative histogram of the luminance component Y of the first present foreground area $BMap_{p'}^{refi}$, $H_{q'}^{Y\_Cum\_sou}$ is the cumulative histogram of the luminance component Y of the second present foreground area $BMap_{q'}^{sou}$;

f-3) letting u'=u'+1, repeating the step f-2) for judging the value of the luminance component Y of the first present foreground area $BMap_{p'}^{refi}$ by the inequality, wherein the "=" is the assignment symbol;

f-4) judging whether the values u' and u'+1 of the first chroma component Cb of the first present foreground area $BMap_{p'}^{refi}$ and the value v' of the first chroma component Cb of the second present foreground area $BMap_{q'}^{sou}$ satisfy the following inequality: $H_{p'}^{Cb\_Cum\_ref}(u') \leq H_{q'}^{Cb\_Cum\_sou}(v') < H_{p'}^{Cb\_Cum\_ref}(u'+1)$, if yes, the value u' of the first chroma component Cb of the first present foreground area $BMap_{p'}^{refi}$ is marching with the value v' of the first chroma component Cb of the second present foreground area $BMap_q^{sou}$, calculating the color transfer function of the value v' of the first chroma component Cb of the second present foreground area $BMap_q^{sou}$, marking the color transfer function as $M_{q'}^{Cb}(v')$, wherein $M_{q'}^{Cb}(v')=u'$, and then providing a step f-6), if no, providing a step f-5), wherein $H_{p'}^{Cb\_Cum\_ref}$ is the cumulative histogram of the first chroma component Cb of the first present foreground area $BMap_{p'}^{refi}$, $H_{q'}^{Cb\_Cum\_sou}$ is the cumulative histogram of the first chroma component Cb of the second present foreground area $BMap_{q'}^{sou}$;

f-5) letting u'=u'+1, repeating the step f-4) for judging the value of the first chroma component Cb of the first present foreground area $BMap_p^{refi}$ by the inequality, wherein the "=" is the assignment symbol;

f-6) judging whether the values u' and u'+1 of the second chroma component Cr of the first present foreground area $BMap_{p'}^{refi}$ and the value v' of the second chroma component Cr of the second present foreground area $BMap_{q'}^{sou}$ satisfy the following inequality: $H_{p'}^{Cr\_Cum\_ref}(u') \leq H_{q'}^{Cr\_Cum\_sou}(v') < H_{p'}^{Cr\_Cum\_ref}(u'+1)$, if yes, the value u' of the second chroma component Cr of the first present foreground area $BMap_{p'}^{refi}$ is marching with the value v' of the second chroma component Cr of the second present foreground area $BMap_{q'}^{sou}$, calculating the color transfer function of the value v' of the second chroma component Cr of the second present foreground area $BMap_{q'}^{sou}$, marking the color transfer function as $M_{q'}^{Cr}(v')$, wherein $M_{q'}^{Cr}(v')=u'$, and then providing a step f-8), if no, providing a step f-7), wherein $H_{p'}^{Cr\_Cum\_ref}$ is the cumulative histogram of the second chroma component Cr of the first present foreground area $BMap_{p'}^{refi}$, $H_{q'}^{Cr\_Crum\_sou}$ is the cumulative histogram of the second chroma component Cr of the second present foreground area $BMap_{q'}^{sou}$;

f-7) letting u'=u'+1, repeating the step f-6) for judging the value of the second chroma component Cr of the first present foreground area $BMap_p^{refi}$ by the inequality, wherein the "=" is the assignment symbol;

f-8) correcting the color of the corresponding area of the uncorrected image $I^{sou}$ by utilizing the $M_{q'}^{Y}(v')$, $M_{q'}^{Cb}(v')$ and $M_{q'}^{Cr}(v')$ for obtaining the corrected area, marking the luminance component, the first chroma component and the second chroma component of the pixel at the position of (x,y) in the corrected area as $Correct^Y(x,y)$, $Correct^{Cb}(x,y)$ and $Correct^{Cr}(x,y)$, wherein $Correct^Y(x,y)=M_{q'}^{Y}(Y^{sou}(x,y))$, $Correct^{Cb}(x,y)=M_{q'}^{Cb}(Cb^{sou}(x,y))$, $Correct^{Cr}(x,y)=M_{q'}^{Cr}(Cr^{sou}(x,y))$, wherein the (x,y) is the coordinate of the pixel in the first present foreground area, the second present foreground area or the corrected area, $Y^{sou}(x,y)$ is the value of the luminance component of the pixel at the position of (x,y) in the second present foreground area, $Cb^{sou}(x,y)$ is the value of the first chroma component of the pixel at the position of (x,y) in the second present foreground area, $Cr^{sou}(x,y)$ is the value of the second chroma component of the pixel at the position of (x,y) in the second present foreground area, $M_{q'}^{Y}(Y^{sou}(x,y))$ is the value of the $Y^{sou}(x,y)$ after being corrected, $M_{q'}^{Cb}(Cb^{sou}(x,y))$ is the value of the $Cb^{sou}(x,y)$ after being corrected, $M_{q'}^{Cr}(Cr^{sou}(x,y))$ is the value of the $Cr^{sou}(x,y)$ after being corrected; and f-9) letting p'=p'+1, q'=q'+1, taking the next untreated foreground area from the marched foreground areas of the $BMap^{ref}$ as the first present foreground area, taking the next untreated foreground area from the marched foreground areas of the $BMap^{sou}$ as the second present foreground area, repeating the step f-2) to the step f-9) again and circularly until all the marched foreground areas of the $BMap^{ref}$ and the $BMap^{sou}$ are treated, wherein the "=" in the equation p'=p'+1 or q'=q'+1 is the assignment symbol.

The step g) specifically comprises steps of:

g-1) taking the area comprising all the pixels of the $BMap^{ref}$ with the pixel value of 0 as the background area, calculating the histograms of the luminance component Y, the first chroma component Cb and the second chroma component Cr of the background area of the $BMap^{ref}$: denoting the histogram of the luminance component Y of the background area as $H^{Y\_ref\_back}(u)$, $$H^{Y\_ref\_back}(u) = \sum_{(x',y') \in background} \delta[u, Y^{back}(x', y')],$$

wherein $Y^{back}(x',y')$ is the value of the luminance component of the pixel at the position of (x',y') in the background area, $\delta[u,$ $$Y^{back}(x', y')] = \begin{cases} 1, & \text{if } u = Y^{back}(x', y') \\ 0, & \text{otherwise} \end{cases},$$

denoting the histogram of the first chroma component Cb of the background area as $H^{Cb\_ref\_back}(u)$, $$H^{Cb\_ref\_back}(u) = \sum_{(x',y') \in background} \delta[u, Cb^{back}(x', y')],$$

wherein $Cb^{back}(x',y')$ is the value of the first chroma component of the pixel at the position of (x',y') in the background area, $$\delta[u, Cb^{back}(x', y')] = \begin{cases} 1, & \text{if } u = Cb^{back}(x', y') \\ 0, & \text{otherwise} \end{cases},$$

denoting the histogram of the second chroma component Cr of the background area as $H^{Cr\_ref\_back}(u)$, $$H^{Cr\_ref\_back}(u) = \sum_{(x',y') \in background} \delta[u, Cr^{back}(x', y')],$$

wherein $Cr^{back}(x',y')$ is the value of the second chroma component of the pixel at the position of (x',y') in the background area, $$\delta[u, Cr^{back}(x', y')] = \begin{cases} 1, & \text{if } u = Cr^{back}(x', y') \\ 0, & \text{otherwise} \end{cases},$$

wherein $u \in [0,255]$;

g-2) calculating the normalized histograms of the luminance component Y, the first chroma component Cb and the second chroma component Cr of the background area: denoting the normalized histogram of the luminance component Y of the background area as $H^{Y\_Norm\_ref\_back}(u)$, $H^{Y\_Norm\_ref\_back}(u)=H^{Y\_ref\_back}(u)/PixelCount^{back}$, denoting the normalized histogram of the first chroma component Cb of the background area as $H^{Cb\_Norm\_ref\_back}(u)$, $H^{Cb\_Norm\_ref\_back}(u)=H^{Cb\_ref\_back}(u)/PixelCount^{back}$, denoting the normalized histogram of the second chroma component Cr of the background area as $H^{Cr\_Norm\_ref\_back}(u)$, $H^{Cr\_Norm\_ref\_back}(u)=H^{Cr\_ref\_back}(u)/\text{PixelCount}^{back}$, wherein $u\in[0,255]$, and the PixelCount$^{back}$ is the number of all the pixels in the background area;

g-3) calculating the cumulative histograms of the luminance component Y, the first chroma component Cb and the second chroma component Cr of the background area: denoting the cumulative histogram of the luminance component Y of the background area as $H^{Y\_Cum\_ref\_back}(u)$, $$H^{Y\_Cum\_ref\_back}(u) = \sum_{j=0}^{u} H^{Y\_Norm\_ref\_back}(j),$$

denoting the cumulative histogram of the first chroma component Cb of the background area as $H^{Cb\_Cum\_ref\_back}(u)$, $$H^{Cb\_Cum\_ref\_back}(u) = \sum_{j=0}^{u} H^{Cb\_Norm\_ref\_back}(j),$$

denoting the cumulative histogram of the second chroma component Cr of the background area as $H^{Cr\_Cum\_ref\_back}(u)$, $$H^{Cr\_Cum\_ref\_back}(u) = \sum_{j=0}^{u} H^{Cr\_Norm\_ref\_back}(j),$$

wherein $u\in[0,255]$; and g-4) calculating the histograms, the normalized histograms and the cumulative histograms of the luminance component Y, the first chroma component Cb and the second chroma component Cr of the background area of the BMap$^{sou}$ by the same method as recited in step g-1) to step g-3).

The step h) specifically comprises steps of:

h-1) judging whether the values u' and u'+1 of the luminance component Y of the background area of the BMap$^{ref}$ and the value v' of the luminance component Y of the background area of the BMap$^{sou}$ satisfy the following inequality: $H^{Y\_Cum\_ref\_back}(u')\leq H^{Y\_Cum\_sou\_back}(v')<H^{Y\_Cum\_ref\_back}(u'+1)$, if yes, the value u' of the luminance component Y of the background area of the BMap$^{ref}$ is marching with the value v' of the luminance component Y of the background area of the BMap$^{sou}$, calculating the color transfer function of the value v' of the luminance component Y of the background area of the BMap$^{sou}$, marking the color transfer function as $M^{Y\_back}(v')$ wherein $M^{Y\_back}(v')=u'$, and then providing a step h-3), if no, providing a step h-2), wherein $H^{Y\_Cum\_ref\_back}$ is the cumulative histogram of the luminance component Y of the background area of the BMap$^{ref}$, $H^{Y\_Cum\_sou\_back}$ is the cumulative histogram of the luminance component Y of the background area of the BMap$^{sou}$;

h-2) letting u'=u'+1, repeating the step h-1) for judging the value of the luminance component Y of the background area of the BMap$^{ref}$ by the inequality, wherein the "=" is the assignment symbol;

h-3) judging whether the values u' and u'+1 of the first chroma component Cb of the background area of the BMap$^{ref}$ and the value v' of the first chroma component Cb of the background area of the BMap$^{sou}$ satisfy the following inequality: $H^{Cb\_Cum\_ref\_back}(u')<H^{Cb\_Cum\_sou\_back}(v')<H^{Cb\_Cum\_ref\_back}(u'+1)$, if yes, the value u' of the first chroma component Cb of the background area of the BMap$^{ref}$ is marching with the value v' of the first chroma component Cb of the background area of the BMap$^{sou}$, calculating the color transfer function of the value v' of the first chroma component Cb of the background area of the BMap$^{sou}$, marking the color transfer function as $M^{Cb\_back}(v')$ wherein $M^{Cb\_back}(v')=u'$, and then providing a step h-5), if no, providing a step h-4), wherein $H^{Cb\_Cum\_ref\_back}$ is the cumulative histogram of the first chroma component Cb of the background area of the BMap$^{ref}$, $H^{Cb\_Cum\_sou\_back}$ is the cumulative histogram of the first chroma component Cb of the background area of the BMap$^{sou}$;

h-4) letting u'=u'+1, repeating the step h-3) for judging the value of the first chroma component Cb of the background area of the BMap$^{ref}$ by the inequality, wherein the "=" is the assignment symbol;

h-5) judging whether the values u' and u'+1 of the second chroma component Cr of the background area of the BMap$^{ref}$ and the value v' of the second chroma component Cr of the background area of the BMap$^{sou}$ satisfy the following inequality: $H^{Cr\_Cum\_ref\_back}(u')\leq H^{Cr\_Cum\_sou\_back}(v')<H^{Cr\_Cum\_ref\_back}(u'+1)$ if yes, the value u' of the second chroma component Cr of the background area of the BMap$^{ref}$ is marching with the value v' of the second chroma component Cr of the background area of the BMap$^{sou}$ calculating the color transfer function of the value v' of the second chroma component Cr of the background area of the BMap$^{sou}$, marking the color transfer function as $M^{Cr\_back}(v')$ wherein $M^{Cr\_back}(v')=u'$, and then providing a step h-7), if no, providing a step h-6), wherein $H^{Cr\_Cum\_ref\_back}$ is the cumulative histogram of the second chroma component Cr of the background area of the BMap$^{ref}$, $H^{Cr\_Cum\_sou\_back}$ is the cumulative histogram of the second chroma component Cr of the background area of the BMap$^{sou}$;

h-6) letting u'=u'+1, repeating the step h-5) for judging the value of the second chroma component Cr of the background area of the BMap$^{ref}$ by the inequality, wherein the "=" is the assignment symbol; and h-7) correcting the color of the corresponding area of the uncorrected image I$^{sou}$ by utilizing the $M^{Y\_back}(v')$, $M^{Cb\_back}(v')$ and $M^{Cr\_back}(v')$ for obtaining the corrected background area, marking the luminance component, the first chroma component and the second chroma component of the pixel at the position of (x,y) in the corrected background area as Correct$^{Y\_back}$(x,y), Correct$^{Cb\_back}$(x,y) and Correct$^{Cr\_back}$(x,y), wherein, Correct$^{Y\_back}$(x,y)=$M^{Y\_back}$(Y$^{sou\_back}$(x,y)), Correct$^{Cb\_back}$(x,y)=$M^{Cb\_back}$(Cb$^{sou\_back}$(x,y), Correct$^{Cr\_back}$(x,y)=$M^{Cr\_back}$(Cr$^{sou\_back}$(x,y)) wherein the (x,y) is the coordinate of the pixel in the background area of the BMap$^{ref}$, the background area of the BMap$^{sou}$ or the corrected background area, Y$^{sou\_back}$(x,y) is the value of the luminance component of the pixel at the position of (x,y) in the background area of the BMap$^{sou}$, Cb$^{sou\_back}$(x,y) is the value of the first chroma component of the pixel at the position of (x,y) in the background area of the BMap$^{sou}$, Cr$^{sou\_back}$(x,y) is the value of the second chroma component of the pixel at the position of (x,y) in the background area of the BMap$^{sou}$, $M^{Y\_back}$(Y$^{sou\_back}$(x,y)) is the value of the Y$^{sou\_back}$(x,y) after being corrected, $M^{Cb\_back}$(Cb$^{sou\_back}$(x,y)) is the value of the Cb$^{sou\_back}$(x,y) after being corrected, $M^{Cr\_back}$(Cr$^{sou\_back}$(x,y)) is the value of the Cr$^{sou\_back}$(x,y) after being corrected.

Therefore, compared with the conventional technology, the present invention has advantages as follows: avoiding transmission error of the color information of the varied areas of the pair of the images by transmitting the color information of the foreground areas and the background area of the reference image to the aberrated image separately, thus sufficiently improves the accuracy of the color correction, reduces the difference between the color of the reference image and the color of the aberrated image, and well prepares for the stereo matching of the pair of colorful stereo microscope images as well as for the three-dimensional reconstruction and three-dimensional measurement; on the other hand, during the correction, the correcting procedure is provided automatically without manual work.

These and other objectives, features, and advantages of the present invention will become apparent from the following detailed description, the accompanying drawings, and the appended claims.

DETAILED DESCRIPTION OF THE PREFERRED EMBODIMENT

Figure 1A:
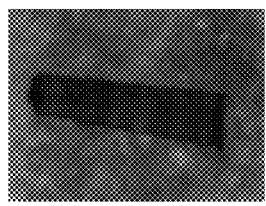
FIG. 1A is an uncorrected image of a first pair of testing images according to a preferred embodiment of the present invention.

Referring to the drawings, the present invention is further illustrated.

The present invention provided a method for color correction of a pair of colorful stereo microscope images, wherein a quantity of the colors of the image is sufficiently reduced by re-quantifying the original colorful stereo microscope image, then saliency areas of the image is obtained through color contrast and the saliency image is iterated K times for obtaining a segmentation map. For simple images, the colorful stereo microscope image may have only one foreground area and one background because object of the colorful stereo microscope image are simple; but for complex images there may be more foreground areas. Therefore, marching area of the reference image and the uncorrected image are obtained by utilizing a color histogram based scheme, and a color mapping function is established between the marching areas of the reference image and the uncorrected image in such a manner that the color of the corresponding area of the uncorrected image is corrected with the color mapping functions of the three color channels.

Figure 1B:
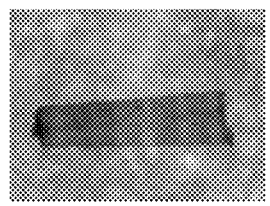
FIG. 1B is a reference image of the first pair of testing images according to the preferred embodiment of the present invention.
Figure 1C:
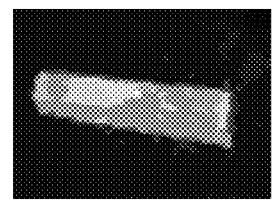
FIG. 1C is a second saliency map of the FIG. 1A according to the preferred embodiment of the present invention.
Figure 1D:
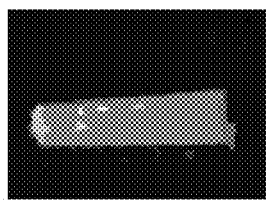
FIG. 1D is a first saliency map of the FIG. 1B according to the preferred embodiment of the present invention.
Figure 2A:
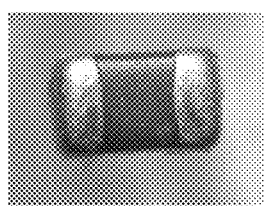
FIG. 2A is the uncorrected image of a second pair of testing images according to the preferred embodiment of the present invention.
Figure 2B:
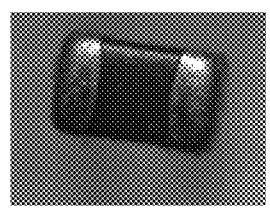
FIG. 2B is the reference image of the second pair of testing images according to the preferred embodiment of the present invention.
Figure 2C:
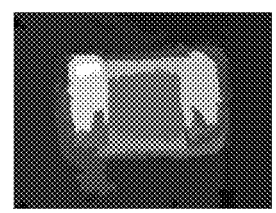
FIG. 2C is the second saliency map of the FIG. 2A according to the preferred embodiment of the present invention.
Figure 2D:
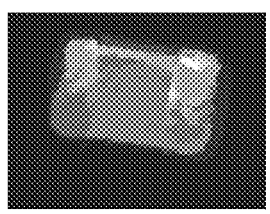
FIG. 2D is the first saliency map of the FIG. 2B according to the preferred embodiment of the present invention.

The method for color correction of a pair of colorful stereo microscope images comprising steps of:

a) taking a first image of a pair of the colorful stereo microscope images in the RGB color space as a reference image $I^{ref}$, and taking a second image of the pair of the colorful stereo microscope images in the RGB color space as an uncorrected image $I^{sou}$, wherein the FIG. 1A corresponds to the FIG. 1B for providing the uncorrected image and the reference image of a first pair of testing images, the FIG. 2A corresponds to the FIG. 2B for providing the uncorrected image and the reference image of a second pair of testing images;

b) obtaining a first saliency map of the reference image $I^{ref}$ and a second saliency map of the uncorrected image $I^{sou}$, wherein the first saliency map is marked as SaliencyMap$^{ref}$ and the second saliency map is marked as SaliencyMap$^{sou}$; obtaining a first segmentation map of the reference image $I^{ref}$ and a second segmentation map of the uncorrected image $I^{sou}$ with the first saliency map of the reference image $I^{ref}$ and the second saliency map of the uncorrected image $I^{sou}$ respectively, wherein the first segmentation map is marked as BMap$^{ref}$ and the second segmentation map is marked as BMap$^{sou}$, wherein the BMap$^{ref}$ and the BMap$^{sou}$ all comprise a plurality of foreground areas, the i'th foreground area of the BMap$^{ref}$ is marked as BMap$_i$$^{refi}$, and the i'th foreground area of the BMap$^{sou}$ is marked as BMap$_i$$^{sou}$, wherein, $1 \le i' \le I'$, the I' is the number of the foreground areas of the BMap$^{ref}$ or the BMap$^{sou}$;

wherein in the preferred embodiment, for obtaining the first saliency map of the reference image $I^{ref}$ and the second saliency map of the uncorrected image $I^{sou}$, the step b) specifically comprises steps of:

b-a1) respectively re-quantifying color values of a R, a G and a B channel of the reference image $I^{ref}$ into M levels for obtaining an initial quantified image corresponding to the reference image $I^{ref}$, wherein the initial quantified image has $M^3$ kinds of color;

b-a2) calculating an occurrence probability of each the color of the initial quantified image for obtaining the color histogram thereof, marking the occurrence probability of the ith color $C_i$ as $P_i$, wherein, $1 \le i \le M^3$;

b-a3) replacing the color whose the occurrence probability is lower than a constant threshold T with the next color in the color histogram of the initial quantified image for obtaining a final quantified image corresponding to the reference image $I^{ref}$, wherein the final quantified image has L kinds of color, wherein for the ith color $C_i$ in the initial quantified image, judging whether $P_i < T$ or not, if yes, replacing the ith color $C_i$ in the initial quantified image with the i+1th color $C_{i+1}$ or the i−1th color next to the $C_i$ in the color histogram, if no, keeping the ith color $C_i$ in the initial quantified image, wherein $L \le M^3$;

wherein in the preferred embodiment, when M=12, and the constant threshold T is 0.05 times of the number of the pixels of the original colorful stereo microscope image, an efficient saliency object is obtained;

b-a4) calculating a saliency value of each the color of the final quantified image for obtaining the first saliency map of the reference image $I^{ref}$, marking the first saliency map as SaliencyMap$^{ref}$, the values of which are the saliency value, and marking the saliency value of the kth color $C_k'$ of the final quantified image as $Sal(C_k')$, $$Sal(C_k') = \sum_{C_j' \in I_q} f(C_j') \times D(C_k', C_j'),$$

wherein $1 \leq k \leq L$, $1 \leq j \leq L$, $C_j'$ is the jth color of the final quantified image, $I_q$ is all the colors of the final quantified image, $f(C_j')$ is the occurrence probability of the $C_j'$ in the final quantified image, $D(C_k', C_j')$ is a distance between the $C_k'$ and the $C_j'$ in the lαβ color space after the $C_k'$ and the $C_j'$ are transformed to the lαβ color space; and b-a5) obtaining the SaliencyMap$^{sou}$ of the uncorrected image $I^{sou}$ by the same method as recited in the step b-a1) to the step b-a4) for obtaining the SaliencyMap$^{ref}$ of the reference image $I^{ref}$;

wherein the FIG. 1C shows the second saliency map of the FIG. 1A, the FIG. 1D shows the first saliency map of the FIG. 1B, the FIG. 2C shows the second saliency map of the FIG. 2A, the FIG. 2D shows the first saliency map of the FIG. 2B;

wherein in the preferred embodiment, for obtaining the first segmentation map of the reference image $I^{ref}$ and the second segmentation map of the uncorrected image $I^{sou}$, the step b) specifically comprises steps of:

b-c1) defining a constant threshold $T_f$, and thresholding the SaliencyMap$^{ref}$ of the reference image $I^{ref}$ by utilizing the constant threshold $T_f$ for obtaining a binary image thereof, wherein the binary image is marked as $B^{ref}$, wherein $T_f \in [0, 255]$, and the value 255 of the $B^{ref}$ marks the foreground area, and the value 0 of the $B^{ref}$ marks the background area;

wherein in the preferred embodiment, a large number of experiment results illustrated that when the constant threshold $T_f$ is 2 times of the average pixel value of all the pixels of the saliency map of the original colorful stereo microscope image, a best result is obtained, that is to say, when obtaining the first segmentation map BMap$^{ref}$ of the reference image $I^{ref}$, the constant threshold $T_f$ is 2 times of the average pixel value of all the pixels of the SaliencyMap$^{ref}$ of the reference image $I^{ref}$, when obtaining the second segmentation map BMap$^{sou}$ of the uncorrected image $I^{sou}$, the constant threshold $T_f$ is 2 times of the average pixel value of all the pixels of the SaliencyMap$^{sou}$ of the uncorrected image $I^{sou}$;

b-c2) obtaining a plurality of initial foreground areas and initial background areas of the reference image $I^{ref}$ by utilizing a pixel value of each the pixel in the $B^{ref}$ wherein each the pixel in the initial foreground areas of the reference image $I^{ref}$ is corresponding to the pixel with the pixel value of 255 in the $B^{ref}$, that is to say the pixel value of the pixel in the $B^{ref}$ corresponding to the pixel in the initial foreground area of the reference image $I^{ref}$ is 255, each pixel in the initial background areas of the reference image $I^{ref}$ is corresponding to the pixel with the pixel value of 0 in the $B^{ref}$, that is to say the pixel value of the pixel in the $B^{ref}$ corresponding to the pixel in the initial background area of the reference image $I^{ref}$ is 0;

b-c3) taking the ith initial foreground area of the $I^{ref}$ under treating as a present foreground area Trimap$_i$, wherein, $1 \leq i \leq I$, I is the number of the initial foreground areas of the reference image $I^{ref}$;

b-c4) denoting an area of $B^{ref}$ corresponding to the Trimap$_i$ as $B_i^{ref}$, marking a min X axis position, a max X axis position, a min Y axis position and a max Y axis position of the pixels in the area $B_i^{ref}$ as miX$_i'$, maX$_i'$, miY$_i'$ and maY$_i'$;

b-c5) enlarging the $B_i^{ref}$ to a rectangle area, marking the rectangle area as $B_i^{refi}$, and marking the min X axis position, the max X axis position, the min Y axis position and the max Y axis position of the pixels in the $B_i^{ref}$ as miX$_i'$, maX$_i'$, miY$_i'$ and maY$_i'$, wherein $miX_i' =$ $$\begin{cases} miX_i - 0.5 \times (maX_i - miX_i), & \text{if } miX_i - 0.5 \times (maX_i - miX_i) \geq 0 \\ 0, & \text{if } miX_i - 0.5 \times (maX_i - miX_i) < 0 \end{cases},$$

$maX_i' =$ $$\begin{cases} maX_i + 0.5 \times (maX_i - miX_i), & \text{if } maX_i + 0.5 \times (maX_i - miX_i) < W \\ W - 1, & \text{if } maX_i + 0.5 \times (maX_i - miX_i) \geq W \end{cases},$$

Figure 1E:
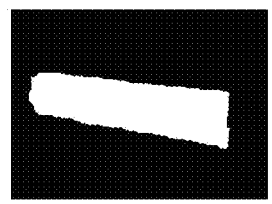
FIG. 1E shows segmented result of the FIG. 1A according to the preferred embodiment of the present invention.
Figure 1F:
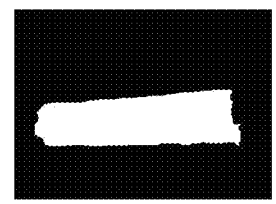
FIG. 1F shows segmented result of the FIG. 1B according to the preferred embodiment of the present invention.
Figure 2E:
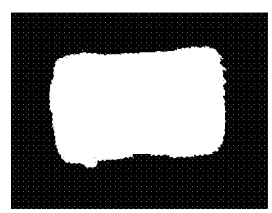
FIG. 2E shows segmented result of the FIG. 2A according to the preferred embodiment of the present invention.
Figure 2F:
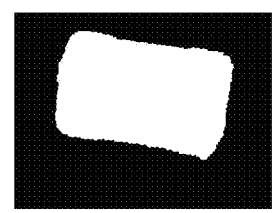
FIG. 2F shows segmented result of the FIG. 2B according to the preferred embodiment of the present invention.

$miY_i' = \begin{cases} miY_i + 0.5 \times (maY_i - miY_i), & \text{if } miY_i + 0.5 \times (maY_i - miY_i) \geq 0 \\ 0, & \text{if } miY_i - 0.5 \times (maY_i - miY_i) < 0 \end{cases},$ $maY_i' =$ $$\begin{cases} maY_i + 0.5 \times (maY_i - miY_i), & \text{if } maY_i + 0.5 \times (maY_i - miY_i) < H \\ H - 1, & \text{if } maY_i + 0.5 \times (maY_i - miY_i) \geq H \end{cases},$$

supposing that a size of the $B_i^{refi}$ is $W_i \times H_i$, then $W_i' = maX_i' - miX_i'$, $H_i = maY_i' - miY_i'$, wherein the W is a width of the $B^{ref}$, H is a height of the $B^{ref}$;

b-c6) enlarging the present foreground area Trimap$_i$ to the rectangle area with the same position as the $B_i^{refi}$, wherein the area is marked as Trimap$_i'$; for each the pixel in the Trimap$_i'$, judging whether the pixel in the Trimap$_i'$ belongs to the foreground area or the background area according to the pixel value of the corresponding pixel in the $B_i^{refi}$, wherein for the pixel having the position of (x,y) in the Trimap$_i'$, judging whether the pixel value of the pixel having the position of (x,y) in the $B_i^{refi}$ is 255 or not, if yes, the pixel having the position of (x,y) in the Trimap$_i'$ belongs to the foreground area, if no, the pixel having the position of (x,y) in the Trimap$_i'$ belongs to the background area, wherein, $0 \leq x \leq W_i$, $0 \leq y \leq H_i$, the $W_i$ is a width of the $B_i^{refi}$ and the Trimap$_i'$, $W_i' = maX_i' - miX_i'$, the $H_i$ is a height of the $B_i^{refi}$ and the Trimap$_i'$, $H_i = maY_i' - miY_i'$;

b-c7) letting miX$_i$=miX$_i'$, maX$_i$=maX$_i'$, miY$_i$=miY$_i'$ and maY$_i$=maY$_i'$, and taking the $B_i^{refi}$ as the new untreated rectangle area $B_i^{refi}$ taking the Trimap$_i'$ as the new present foreground area Trimap$_i$, repeating the step b-c5) to the step b-c7) again and circularly, judging whether the number of the pixels in the foreground area of the Trimap$_i'$ after repeating K times is equal to the number of the pixels in the foreground of the Trimap$_i'$ after repeating K-1 times, if yes, segmenting the Trimap$_i'$ with a GrabCut method, which is an image segmentation method based on graph cuts, for obtaining a final foreground area and a final background area of the Trimap$_i'$, if no, repeating the step b-c5) to the step b-c7) again, wherein the "=" is an assignment symbol, an initial value of the K is 1;

wherein in the preferred embodiment, a large number of experiment results illustrated that when K=4, that is to say iterating 4 times, the number of the pixels in the foreground area is equal to the number of the pixels in the foreground area after iterating 3 times;

b-c8) letting i=i+1, wherein the "=" is the assignment symbol, taking the next untreated initial foreground area of the reference image $I^{ref}$ as the present foreground area Trimap$_i$, repeating the step b-c4) to the step b-c8) again and circularly until all the initial foreground areas of the reference image $I^{ref}$ are treated for obtaining the first segmentation map $BMap^{ref}$ of the reference image $I^{ref}$, marking the i'th foreground area of the $BMap^{ref}$ as $BMap_{i'}^{ref_i}$, $1 \leq i' < I'$, wherein the I' is the number of the foreground areas of the $BMap^{ref}$; and b-c9) obtaining the $BMap^{sou}$ of the uncorrected image $I^{sou}$ by the same method as recited in the step b-c1) to the step b-c8) for obtaining the $BMap^{ref}$ of the reference image $I^{ref}$, marking the i'th foreground area of the $BMap^{sou}$ as $BMap_{i'}^{sou}$, wherein, $1 \leq i' \leq I'$, the I' is the number of the foreground areas of the $BMap^{sou}$;

wherein the FIG. 1E shows the segmented result of the FIG. 1A, the FIG. 1F shows the segmented result of the FIG. 1B, the FIG. 2E shows the segmented result of the FIG. 2A, the FIG. 2F shows the segmented result of the FIG. 2B;

c) calculating histograms, normalized histograms and cumulative histograms of a luminance component Y, a first chroma component Cb and a second chroma component Cr for each the foreground area of the $BMap^{ref}$ in the YCbCr color space, and calculating the histograms, the normalized histograms and the cumulative histograms of the luminance component Y, the first chroma component Cb and the second chroma component Cr for each the foreground area of the $BMap^{sou}$ in the YCbCr color space;

wherein in the preferred embodiment, the step c) specifically comprises steps of:

c-1) taking the i'th foreground area $BMap_{i'}^{ref_i}$ under treating of the $BMap^{ref}$ as the present foreground area, wherein, $1 \leq i' \leq I'$, the I' is the number of the foreground areas of the $BMap^{ref}$;

c-2) calculating the histograms of the luminance component Y, the first chroma component Cb and the second chroma component Cr of the $BMap_{i'}^{ref_i}$: denoting the histogram of the luminance component Y of the $BMap_{i'}^{ref_i}$ as $H_{i'}^{Y\_ref}(u)$, $$H_{i'}^{Y\_ref}(u) = \sum_{(x',y') \in BMap_{i'}^{ref_i}} \delta[u, Y(x', y')],$$

wherein $Y(x',y')$ is the value of the luminance component of the pixel at the position of $(x',y')$ in the $BMap_{i'}^{ref_i}$, $$\delta[u, Y(x', y')] = \begin{cases} 1, & \text{if } u = Y(x', y') \\ 0, & \text{if } u \neq Y(x', y') \end{cases},$$

denoting the histogram of the first chroma component Cb of the $BMap_{i'}^{ref_i}$ as $H_{i'}^{Cb\_ref}(u)$, $$H_{i'}^{Cb\_ref}(u) = \sum_{(x',y') \in BMap_{i'}^{ref_i}} \delta[u, Cb(x', y')],$$

wherein $Cb(x',y')$ is the value of the first chroma component of the pixel at the position of $(x',y')$ in the $BMap_{i'}^{ref_i}$, $$\delta[u, Cb(x', y')] = \begin{cases} 1, & \text{if } u = Cb(x', y') \\ 0, & \text{if } u \neq Cb(x', y') \end{cases},$$

denoting the histogram of the second chroma component Cr of the $BMap_{i'}^{ref_i}$ as $H_{i'}^{Cr\_ref}(u)$, $$H_{i'}^{Cr\_ref}(u) = \sum_{(x',y') \in BMap_{i'}^{ref_i}} \delta[u, Cr(x', y')],$$

wherein $Cr(x',y')$ is the value of the second chroma component of the pixel at the position of $(x',y')$ in the $BMap_{i'}^{ref_i}$, $$\delta[u, Cr(x', y')] = \begin{cases} 1, & \text{if } u = Cr(x', y') \\ 0, & \text{if } u \neq Cr(x', y') \end{cases},$$

wherein $u \in [0,255]$;

c-3) calculating the normalized histograms of the luminance component Y, the first chroma component Cb and the second chroma component Cr of the $BMap_{i'}^{ref_i}$: denoting the normalized histogram of the luminance component Y of the $BMap_{i'}^{ref_i}$ as $H_{i'}^{Y\_Norm\_ref}(u)$, $H_{i'}^{Y\_Norm\_ref}(u) = H_{i'}^{Y\_ref}(u) / PixelCount_{i'}$, denoting the normalized histogram of the first chroma component Cb of the $BMap_{i'}^{ref_i}$ as $H_{i'}^{Cb\_Norm\_ref}(u)$, $H_{i'}^{Cb\_Norm\_ref}(u) = H_{i'}^{Cb\_ref}(u) / PixelCount_{i'}$, denoting the normalized histogram of the second chroma component Cr of the $BMap_{i'}^{ref_i}$ as $H_{i'}^{Cr\_Norm\_ref}(u)$ $H_{i'}^{Cr\_Norm\_ref}(u) = H_{i'}^{Cr\_ref}(u) / PixelCount_{i'}$, wherein $u \in [0,255]$, and the $PixelCount_{i'}$ is the number of the pixels in the present foreground area $BMap_{i'}^{ref_i}$;

c-4) calculating the cumulative histograms of the luminance component Y, the first chroma component Cb and the second chroma component Cr of the $BMap_{i'}^{ref_i}$: denoting the cumulative histogram of the luminance component Y of the $BMap_{i'}^{ref_i}$ as $H_{i'}^{Y\_Cum\_ref}(u)$ $$H_{i'}^{Y\_Cum\_ref}(u) = \sum_{j=0}^{u} H_{i'}^{Y\_Norm\_ref}(j),$$

denoting the cumulative histogram of the first chroma component Cb of the $BMap_{i'}^{ref_i}$ as $H_{i'}^{Cb\_Cum\_ref}(u)$, $$H_{i'}^{Cb\_Cum\_ref}(u) = \sum_{j=0}^{u} H_{i'}^{Cb\_Norm\_ref}(j),$$

denoting the cumulative histogram of the second chroma component Cr of the $BMap_{i'}^{ref_i}$ as $H_{i'}^{Cr\_Cum\_ref}(u)$, $$H_{i'}^{Cr\_Cum\_ref}(u) = \sum_{j=0}^{u} H_{i'}^{Cr\_Norm\_ref}(j),$$

wherein $u \delta [0,255]$;

c-5) letting $i' = i' + 1$, taking the next untreated foreground area of the $BMap^{ref}$ as the present foreground area, repeating the step c-2) to the step c-5) again and circularly until all the foreground areas of the $BMap^{ref}$ are treated, wherein the "=" is the assignment symbol; and c-6) calculating the histograms, the normalized histograms and the cumulative histograms of the luminance component Y, the first chroma component Cb and the second chroma component Cr of each the foreground area of the BMap$^{sou}$ by the same method as recited in the step c-1) to the step c-5);

d) calculating color histograms for each the foreground area of the BMap$_{i'}^{refi}$ and the BMap$^{sou}$ in the RGB color space;

wherein in the preferred embodiment, the step d) specifically comprises steps of:

d-a1) taking the i'th foreground area BMap$_{i'}^{refi}$ under treating of the BMap$^{ref}$ as the present foreground area, wherein, 1≤i'≤I', the I' is the number of the foreground areas of the BMap$^{ref}$;

d-a2) calculating the color histogram of the present foreground area BMap$_{i'}^{refi}$: denoting the color histogram as H$_{i'}^{RGB\_ref}$(c), $$H_{i'}^{RGB\_ref}(c) = \sum_{(x',y') \in BMap_{i'}^{refi}} \delta[c, C(x', y')] / PixelCount_{i'}^{PGB\_ref},$$

wherein C=256×R+16×G+B, the R is the value of a red component of the pixel in the BMap$_{i'}^{refi}$, the G is the value of a green component of the pixel in the BMap$_{i'}^{refi}$, the B is the value of a blue component of the pixel in the BMap$_{i'}^{refi}$, wherein C(x',y') is the value of the C of the pixel at the position of (x',y') in the BMap$_{i'}^{refi}$, $$\delta[c, C(x', y')] = \begin{cases} 1, & \text{if } c = C(x', y') \\ 0, & \text{if } c \neq C(x', y'), \end{cases}$$

PixelCount$_{i'}^{RCB\_ref}$ is the number of the pixels in the present foreground area BMap$_{i'}^{refi}$;

d-a3) letting i'=i'+1, taking the next untreated foreground area of the BMap$^{ref}$ as the present foreground area, repeating the step d-a2) to the step d-a3) again and circularly until all the foreground areas of the BMap$^{ref}$ are treated, wherein the "=" is the assignment symbol; and d-a4) calculating the color histogram H$_{i'}^{RGB\_sou}$(c) of each the foreground area of the BMap$^{sou}$ by the same method as recited in the step d-a1) to the step d-a3), that is to say: first, taking the i'th foreground area BMap$_{i'}^{sou}$ under treating of the BMap$^{sou}$ as the present foreground area, wherein, 1≤i'≤I', the I' is the number of the foreground areas of the BMap$^{sou}$; second, calculating the color histogram of the present foreground area BMap$_{i'}^{sou}$, denoting the color histogram as H$_{i'}^{RGB\_sou}$(c), $$H_{i'}^{RGB\_sou}(c) = \sum_{(x',y') \in BMap_{i'}^{sou}} \delta[c, C(x', y')] / PixelCount_{i'}^{PGB\_sou},$$

wherein C=256×R+16×G+B, the R is the value of the red component of the pixel in the BMap$_{i'}^{sou}$, the G is the value of the green component of the pixel in the BMap$_{i'}^{sou}$, the B is the value of the blue component of the pixel in the BMap$^{i'sou}$, wherein C(x',y') is the value of the C of the pixel at the position of (x',y') in the BMap$_{i'}^{sou}$, $$\delta[c, C(x', y')] = \begin{cases} 1, & \text{if } c = C(x', y') \\ 0, & \text{if } c \neq C(x', y'), \end{cases}$$

PixelCount$_{i'}^{RGB\_sou}$ is the number of the pixels in the present foreground area BMap$_{i'}^{sou}$; third, letting i'=i'+1, taking the next untreated foreground area of the BMap$^{sou}$ as the present foreground area, repeating the second step to the third step again and circularly until all the foreground areas of the BMap$^{sou}$ are treated;

e) for each the foreground area of the BMap$^{ref}$, calculating a similarity value of the color histogram of the foreground area of the BMap$^{ref}$ and the color histogram of the corresponding foreground area of the BMap$^{sou}$ and judging whether the foreground area of the BMap$^{ref}$ is marching with the corresponding foreground area of the BMap$^{sou}$ or not from the similarity value of the color histograms of the two marching foreground areas;

wherein whether the two foreground areas are marching with each other or not is judged from the similarity value, a range of the similarity value function is between 0 and 1, the higher value means that the two foreground areas are more similar to each other, when the value is 1, the two foreground areas are completely similar to each other;

wherein in the preferred embodiment, the step e) specifically comprises steps of:

e-1) taking the pth foreground area BMap$_p^{refi}$ under treating of the BMap$^{ref}$ as the first present foreground area, taking the qth foreground area BMap$_q^{sou}$ under treating of the BMap$^{sou}$ as the second present foreground area, wherein, 1≤p≤P, 1≤q≤Q, the P is the number of the foreground areas of the BMap$^{ref}$, the Q is the number of the foreground areas of the BMap$^{sou}$;

e-2) calculating the similarity value of the color histogram H$_p^{RGB\_ref}$ of the first foreground area BMap$_p^{refi}$ and the color histogram H$_q^{RGB\_sou}$ of the second foreground area BMap$_q^{sou}$, marking the similarity value as Sim(H$_p^{RGB\_ref}$, H$_q^{RGB\_sou}$), 0≤Sim(H$_p^{RGB\_ref}$,H$_q^{RGB\_sou}$)≤1, wherein the larger the value of Sim(H$_p^{RGB\_ref}$, H$_q^{RGB\_sou}$) is, the more similar the two color histograms are, and the value 1 of Sim(H$_p^{RGB\_ref}$,H$_q^{RGB\_sou}$) means that the two color histograms are same with each other; there are several existed different methods to measure the similarity of two histograms which can be used in this step, wherein in the preferred embodiment, $$Sim(H_p^{RGB\_ref}, H_q^{RGB\_sou}) = \sum_{c=MinC}^{MaxC} \sqrt{H_p^{RGB\_ref}(c) \times H_q^{RGB\_sou}(c + \Delta c_{max})},$$

wherein the MaxC is the max value of the C of the first foreground area BMap$_p^{refi}$, the MinC is the min value of the C of the first foreground area BMap$_p^{refi}$, and $$\Delta c_{max} = \underset{\Delta c}{\mathrm{argmax}} \left( \sum_{c=MinC}^{MaxC} \sqrt{H_p^{RGB\_ref}(c) \times H_q^{RGB\_sou}(c + \Delta c)} \right)$$

with the constraint that H$_q^{RGB\_sou}$(c+Δc$_{max}$) is within a definition of the color histogram H$_q^{RGB\_sou}$(c);

e-3) judging whether Sim(H$_p^{RGB\_ref}$,H$_q^{RGB\_sou}$) is larger than a threshold T$_s$ or not, if yes, the first foreground area BMap$_p^{refi}$ is marching with the second foreground area BMap$_q^{sou}$, if no, the first foreground area BMap$_p^{refi}$ is not marching with the second foreground area BMap$_q^{sou}$; wherein in the preferred embodiment the T$_s$=1; and e-4) letting p=p+1, q=q+1, wherein the "=" is the assignment symbol, taking the next untreated foreground area of the BMap$^{ref}$ as the first present foreground area, taking the next untreated foreground area of the BMap$^{sou}$ as the second present foreground area, repeating the step e-2) to the step e-4) again and circularly until all the foreground areas of the BMap$^{ref}$ or the foreground areas of the BMap$^{sou}$ are treated;

f) for each pair of the foreground area of the BMap$^{ref}$ and the marched foreground area of the BMap$^{sou}$, calculating transfer functions with respect to a luminance component Y, a first chroma component Cb and a second chroma component Cr of the pair, and correcting the luminance component Y, the first chroma component Cb and the second chroma component Cr of the area of the uncorrected image I$^{sou}$ corresponding to the marched foreground area of the BMap$^{sou}$ according to the transfer functions with respect to the luminance component, the first chroma component and the second chroma component of the foreground area of the BMap$^{ref}$ and the marched foreground area of the BMap$^{sou}$;

wherein in the preferred embodiment, the step f) specifically comprises steps of:

f-1) taking the matched foreground areas under treating of the BMap$^{ref}$ and the BMap$^{sou}$ respectively as the first present foreground area and the second present foreground area, supposing that the first present foreground area is the p'th matched foreground area BMap$_p^{refi}$ under treating of the BMap$^{ref}$, supposing that the second present foreground area is the q'th matched foreground area BMap$_q^{sou}$ under treating of the BMap$^{sou}$, wherein, $1 \leq p' \leq S$, $1 \leq q' \leq S$, the S is the number of the pairs of the matched foreground areas of the BMap$^{ref}$ and the BMap$^{sou}$;

f-2) judging whether the values u' and u'+1 of the luminance component Y of the first present foreground area BMap$_p^{refi}$ and the value v' of the luminance component Y of the second present foreground area BMap$_q^{sou}$ satisfy a following inequality: $H_{p'}^{Y\_Cum\_ref}(u') \leq H_{q'}^{Y\_Cum\_sou}(v') < H_{p'}^{Y\_Cum\_ref}(u'+1)$ if yes, the value u' of the luminance component Y of the first present foreground area BMap$_p^{refi}$ is marching with the value v' of the luminance component Y of the second present foreground area BMap$_q^{sou}$, calculating a color transfer function of the value v' of the luminance component Y of the second present foreground area BMap$_q^{sou}$, marking the color transfer function as $M_{q'}^{Y}(v')$, wherein $M_{q'}^{Y}(v')=u'$ and then providing a step f-4), if no, providing a step f-3), wherein $H_{p'}^{Y\_Cum\_ref}$ is the cumulative histogram of the luminance component Y of the first present foreground area BMap$_p^{refi}$, $H_{q'}^{Y\_Cum\_sou}$ is the cumulative histogram of the luminance component Y of the second present foreground area BMap$_q^{sou}$;

f-3) letting u'=u'+1, repeating the step f-2) for judging the value of the luminance component Y of the first present foreground area BMap$_p^{refi}$ by the inequality, wherein the "=" is the assignment symbol;

f-4) judging whether the values u' and u'+1 of the first chroma component Cb of the first present foreground area BMap$_p^{refi}$ and the value v' of the first chroma component Cb of the second present foreground area BMap$_q^{sou}$ satisfy the following inequality: $H_{p'}^{Cb\_Cum\_ref}(u') \leq H_{q'}^{Cb\_Cum\_sou}(v') < H_{p'}^{Cb\_Cum\_ref}(u'+1)$, if yes, the value u' of the first chroma component Cb of the first present foreground area BMap$_p^{refi}$ is marching with the value v' of the first chroma component Cb of the second present foreground area BMap$_q^{sou}$, calculating the color transfer function of the value v' of the first chroma component Cb of the second present foreground area BMap$_q^{sou}$, marking the color transfer function as $M_{q'}^{Cb}(v')$, wherein $M_{q'}^{Cb}(v')=u'$, and then providing a step f-6), if no, providing a step f-5), wherein $H_{p'}^{Cb\_Cum\_ref}$ is the cumulative histogram of the first chroma component Cb of the first present foreground area BMap$_p^{refi}$, $H_{q'}^{Cb\_Cum\_sou}$ is the cumulative histogram of the first chroma component Cb of the second present foreground area BMap$_q^{sou}$;

f-5) letting u'=u'+1, repeating the step f-4) for judging the value of the first chroma component Cb of the first present foreground area BMap$_p^{refi}$ by the inequality, wherein the "=" is the assignment symbol;

f-6) judging whether the values u' and u'+1 of the second chroma component Cr of the first present foreground area BMap$_p^{refi}$ and the value v' of the second chroma component Cr of the second present foreground area BMap$_q^{sou}$ satisfy the following inequality: $H_{p'}^{Cr\_Cum\_ref}(u') \leq H_{q'}^{Cr\_Cum\_sou}(v') < H_{p'}^{Cr\_Cum\_ref}(u'+1)$, if yes, the value u' of the second chroma component Cr of the first present foreground area BMap$_p^{refi}$ is marching with the value v' of the second chroma component Cr of the second present foreground area BMap$_q^{sou}$, calculating the color transfer function of the value v' of the second chroma component Cr of the second present foreground area BMap$_q^{sou}$, marking the color transfer function as $M_{q'}^{Cr}(v')$, wherein $M_{q'}^{Cr}(v')=u'$, and then providing a step f-8), if no, providing a step f-7), wherein $H_{p'}^{Cr\_Cum\_ref}$ is the cumulative histogram of the second chroma component Cr of the first present foreground area BMap$_p^{refi}$, $H_{q'}^{Cr\_Cum\_sou}$ is the cumulative histogram of the second chroma component Cr of the second present foreground area BMap$_q^{sou}$;

f-7) letting u'=u'+1, repeating the step f-6) for judging the value of the second chroma component Cr of the first present foreground area BMap$_p^{refi}$ by the inequality, wherein the "=" is the assignment symbol;

f-8) correcting the color of the corresponding area of the uncorrected image I$^{sou}$ by utilizing the $M_{q'}^{Y}(v')$, $M_{q'}^{Cb}(v')$ and $M_{q'}^{Cr}(v')$ for obtaining the corrected area, marking the luminance component, the first chroma component and the second chroma component of the pixel at the position of (x,y) in the corrected area as Correct$^Y$(x,y), Correct$^{Cb}$(x,y) and Correct$^{Cr}$(x,y), wherein Correct$^Y$(x,y)=$M_{q'}^{Y}$[Y$^{sou}$(x,y)], Correct$^{Cb}$(x,y)=$M_{q'}^{Cb}$[Cb$^{sou}$(x,y)], Correct$^{Cr}$(x,y)=$M_{q'}^{Cr}$[Cr$^{sou}$(x,y)], wherein the (x,y) is the coordinate of the pixel in the first present foreground area, the second present foreground area or the corrected area, Y$^{sou}$(x,y) is the value of the luminance component of the pixel at the position of (x,y) in the second present foreground area, Cb$^{sou}$(x,y) is the value of the first chroma component of the pixel at the position of (x,y) in the second present foreground area, Cr$^{sou}$(x,y) is the value of the second chroma component of the pixel at the position of (x,y) in the second present foreground area, $M_{q'}^{Y}$(Y$^{sou}$(x,y)) is the value of the Y$^{sou}$(x,y) after being corrected, $M_{q'}^{Cb}$(Cb$^{sou}$(x,y)) is the value of the Cb$^{sou}$(x,y) after being corrected, $M_{q'}^{Cr}$(Cr$^{sou}$(x,y)) is the value of the Cr$^{sou}$(x,y) after being corrected; and f-9) letting p'=p'+1, q'=q'+1, taking the next untreated foreground area from the marched foreground areas of the BMap$^{ref}$ as the first present foreground area, taking the next untreated foreground area from the marched foreground areas of the BMap$^{sou}$ as the second present foreground area, repeating the step f-2) to the step f-9) again and circularly until all the marched foreground areas of the BMap$^{ref}$ and the BMap$^{sou}$ are treated, then combining the luminance component, the first chroma component and the second chroma component of each the corrected area for obtaining the corrected foreground areas of the uncorrected image I$^{sou}$, wherein the "=" in the equation p'=p'+1 or q'=q'+1 is the assignment symbol;

wherein after all the marched foreground areas are treated, the color of the background area is corrected; the background area comprises all pixels which do not belong to any of the foreground areas, thus, the reference image only has one background area as well as the uncorrected image;

g) calculating the histograms, the normalized histograms and the cumulative histograms of the luminance component Y, the first chroma component Cb and the second chroma component Cr of the background area of the BMap$^{ref}$ in the YCbCr color space, and calculating the histograms, the normalized histograms and the cumulative histograms of the luminance component Y, the first chroma component Cb and the second chroma component Cr of the background area of the BMap$^{sou}$ in the YCbCr color space;

wherein in the preferred embodiment, the step g) specifically comprises steps of:

g-1) taking the area comprising all the pixels of the BMap$^{ref}$ with the pixel value of 0 as the background area, calculating the histograms of the luminance component Y, the first chroma component Cb and the second chroma component Cr of the background area of the BMap$^{ref}$: denoting the histogram of the luminance component Y of the background area as $H^{Y\_ref\_back}$(u), $$H^{Y\_ref\_back}(u) = \sum_{(x',y') \in background} \delta[u, Y^{back}(x', y')],$$

wherein Y$^{back}$(x',y') is the value of the luminance component of the pixel at the position of (x',y') in the background area, $$\delta[u, Y^{back}(x', y')] = \begin{cases} 1, & \text{if } u = Y^{back}(x', y') \\ 0, & \text{otherwise,} \end{cases}$$

denoting the histogram of the first chroma component Cb of the background area as $H^{Cb\_ref\_back}$(u), $$H^{Cb\_ref\_back}(u) = \sum_{(x',y') \in background} \delta[u, Cb^{back}(x', y')],$$

wherein Cb$^{back}$(x',y') is the value of the first chroma component of the pixel at the position of (x',y') in the background area, $$\delta[u, Cb^{back}(x', y')] = \begin{cases} 1, & \text{if } u = Cb^{back}(x', y') \\ 0, & \text{otherwise,} \end{cases}$$

denoting the histogram of the second chroma component Cr of the background area as $H^{Cr\_ref\_back}$(u), $$H^{Cr\_ref\_back}(u) = \sum_{(x',y') \in background} \delta[u, Cr^{back}(x', y')],$$

wherein Cr$^{back}$(x',y') is the value of the second chroma component of the pixel at the position of (x',y') in the background area, $$\delta[u, Cr^{back}(x', y')] = \begin{cases} 1, & \text{if } u = Cr^{back}(x', y') \\ 0, & \text{otherwise,} \end{cases}$$

wherein u∈[0,255];

g-2) calculating the normalized histograms of the luminance component Y, the first chroma component Cb and the second chroma component Cr of the background area: denoting the normalized histogram of the luminance component Y of the background area as $H^{Y\_Norm\_ref\_back}$(u), $H^{Y\_Norm\_ref\_back}$(u)=$H^{Y\_ref\_back}$(u)/PixelCount$^{back}$, denoting the normalized histogram of the first chroma component Cb of the background area as $H^{Cb\_Norm\_ref\_back}$(u), $H^{Cb\_Norm\_ref\_back}$(u)=$H^{Cb\_ref\_back}$(u)/PixelCount$^{back}$, denoting the normalized histogram of the second chroma component Cr of the background area as $H^{Cr\_Norm\_ref\_back}$(u), $H^{Cr\_Norm\_ref\_back}$(u)=$H^{Cr\_ref\_back}$(u)/PixelCount$^{back}$, wherein u∈[0,255], and the Pixe/Count$^{back}$ is the number of all the pixels in the background area;

g-3) calculating the cumulative histograms of the luminance component Y, the first chroma component Cb and the second chroma component Cr of the background area: denoting the cumulative histogram of the luminance component Y of the background area as $H^{Y\_Cum\_ref\_back}$(u), $$H^{Y\_Cum\_ref\_back}(u) = \sum_{j=0}^{u} H^{Y\_Norm\_ref\_back}(j),$$

denoting the cumulative histogram of the first chroma component Cb of the background area as $H^{Cb\_Cum\_ref\_back}$(u), $$H^{Cb\_Cum\_ref\_back}(u) = \sum_{j=0}^{u} H^{CB\_Norm\_ref\_back}(j),$$

denoting the cumulative histogram of the second chroma component Cr of the background area as $H^{Cr\_Cum\_ref\_back}$(u), $$H^{Cr\_Cum\_ref\_back}(u) = \sum_{j=0}^{u} H^{Cr\_Norm\_ref\_back}(j),$$

wherein u∈[0,255]; and g-4) calculating the histograms, the normalized histograms and the cumulative histograms of the luminance component Y, the first chroma component Cb and the second chroma component Cr of the background area of the BMap$^{sou}$ by the same method as recited in step g-1) to step g-3);

h) calculating transfer functions with respect to the luminance component, the first chroma component and the second chroma component of the background area of the BMap$^{ref}$ and the background area of the BMap$^{sou}$, and correcting the luminance component Y, the first chroma component Cb and the second chroma component Cr of the area of the uncorrected image I$^{sou}$ corresponding to the background area of the BMap$^{sou}$ according to the transfer functions with respect to the luminance component, the first chroma component and the second chroma component of the background areas of the BMap$^{ref}$ and the BMap$^{sou}$;

wherein in the preferred embodiment, the step h) is similar to the step f), the step h) specifically comprises steps of:

h-1) judging whether the values u' and u'+1 of the luminance component Y of the background area of the BMap$^{ref}$ and the value v' of the luminance component Y of the background area of the BMap$^{sou}$ satisfy the following inequality: $H^{Y\_Cum\_ref\_back}$(u')≤$H^{Y\_Cum\_sou\_back}$(v')<$H^{Y\_Cum\_ref\_back}$(u'+1), if yes, the value u' of the luminance component Y of the background area of the BMap$^{ref}$ is marching with the value v' of the luminance component Y of the background area of the BMap$^{sou}$, calculating the color transfer function of the value v' of the luminance component Y of the background area of the BMap$^{sou}$, marking the color transfer function as $M^{Y\_back}(v')$ wherein $M^{Y\_back}(v')=u'$, and then providing a step h-3); if no, providing a step h-2), wherein $H^{Y\_Cum\_ref\_back}$ is the cumulative histogram of the luminance component Y of the background area of the $BMap^{ref}$, $H^{Y\_Cum\_sou\_back}$ is the cumulative histogram of the luminance component Y of the background area of the $BMap^{sou}$;

h-2) letting u'=u'+1, repeating the step h-1) for judging the value of the luminance component Y of the background area of the $BMap^{ref}$ by the inequality, wherein the "=" is the assignment symbol;

h-3) judging whether the values u' and u'+1 of the first chroma component Cb of the background area of the $BMap^{ref}$ and the value v' of the first chroma component Cb of the background area of the $BMap^{sou}$ satisfy the following inequality: $H^{Cb\_Cum\_ref\_back}(u') \leq H^{Cb\_Cum\_sou\_back}(v') < H^{Cb\_Cum\_ref\_back}(u'+1)$, if yes, the value u' of the first chroma component Cb of the background area of the $BMap^{ref}$ is marching with the value v' of the first chroma component Cb of the background area of the $BMap^{sou}$, calculating the color transfer function of the value v' of the first chroma component Cb of the background area of the $BMap^{sou}$, marking the color transfer function as $M^{Cb\_back}(v')$ wherein $M^{Cb\_back}(v')=u'$, and then providing a step h-5), if no, providing a step h-4), wherein $H^{Cb\_Cum\_ref\_back}$ is the cumulative histogram of the first chroma component Cb of the background area of the $BMap^{ref}$, $H^{Cb\_Cum\_sou\_back}$ is the cumulative histogram of the first chroma component Cb of the background area of the $BMap^{sou}$;

h-4) letting u'=u'+1, repeating the step h-3) for judging the value of the first chroma component Cb of the background area of the $BMap^{ref}$ by the inequality, wherein h-5) judging whether the values u' and u'+1 of the second chroma component Cr of the background area of the $BMap^{ref}$ and the value v' of the second chroma component Cr of the background area of the $BMap^{sou}$ satisfy the following inequality: $H^{Cr\_Cum\_ref\_back}(u') \leq H^{Cr\_Cum\_sou\_back}(v') < H^{Cr\_Cum\_ref\_back}(u'+1)$, if yes, the value u' of the second chroma component Cr of the background area of the $BMap^{ref}$ is marching with the value v' of the second chroma component Cr of the background area of the $BMap^{sou}$, calculating the color transfer function of the value v' of the second chroma component Cr of the background area of the $BMap^{sou}$, marking the color transfer function as $M^{Cr\_back}(v')$ wherein $M^{Cr\_back}(v')=u'$, and then providing a step h-7), if no, providing a step h-6), wherein $H^{Cr\_Cum\_ref\_back}$ is the cumulative histogram of the second chroma component Cr of the background area of the $BMap^{ref}$, $H^{Cr\_Cum\_sou\_back}$ is the cumulative histogram of the second chroma component Cr of the background area of the $BMap^{sou}$;

h-6) letting u'=u'+1, repeating the step h-5) for judging the value of the second chroma component Cr of the background area of the $BMap^{ref}$ by the inequality, wherein the "=" is the assignment symbol; and h-7) correcting the color of the corresponding area of the uncorrected image $I^{sou}$ by utilizing the $M^{Y\_back}(v')$, $M^{Cb\_back}(v')$ and $M^{Cr\_back}(v')$ for obtaining the corrected background area, marking the luminance component, the first chroma component and the second chroma component of the pixel at the position of (x,y) in the corrected background area as $Correct^{Y\_back}(x,y)$, $Correct^{Cb\_back}(x,y)$ and $Correct^{Cr\_back}(x,y)$, wherein, $Correct^{Y\_back}(x,y)=M^{Y\_back}(Y^{sou\_back}(x,y))$, $Correct^{Cb\_back}(x,y)=M^{Cb\_back}(Cb^{sou\_back}(x,y))$, $Correct^{Cr\_back}(x,y)=M^{Cr\_back}(Cr^{sou\_back}(x,y))$ wherein the (x,y) is the coordinate of the pixel in the background area of the $BMap^{ref}$, the background area of the $BMap^{sou}$ or the corrected background area, $Y^{sou\_back}(x,y)$ is the value of the luminance component of the pixel at the position of (x,y) in the background area of the $BMap^{sou}$, $Cb^{sou\_back}(x,y)$ is the value of the first chroma component of the pixel at the position of (x,y) in the background area of the $BMap^{sou}$, $Cr^{sou\_back}(x,y)$ is the value of the second chroma component of the pixel at the position of (x,y) in the background area of the $BMap^{sou}$, $M^{Y\_back}(Y^{sou\_back}(x,y))$ is the value of the $Y^{so\_back}(x,y)$ after being corrected $M^{Cb\_back}(Cb^{sou\_back}(x,y))$ is the value of the $Cb^{sou\_back}(x,y)$ after being corrected, $M^{Cr\_back}(Cr^{sou\_back}(x,y))$ is the value of the $Cr^{sou\_back}(x,y)$ after being corrected; and i) combining the luminance component, the first chroma component and the second chroma component of each corrected area of the uncorrected image for obtaining an corrected image.

Figure 3:
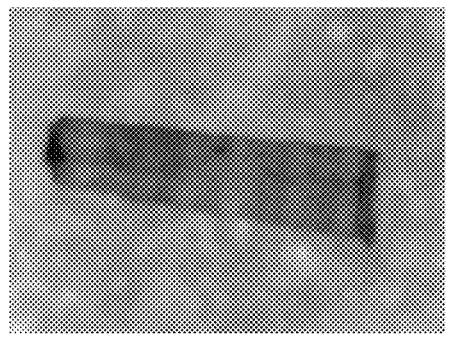
FIG. 3 is an corrected image of the FIG. 1A corrected by the method recited in the present invention according to the preferred embodiment of the present invention.
Figure 4:
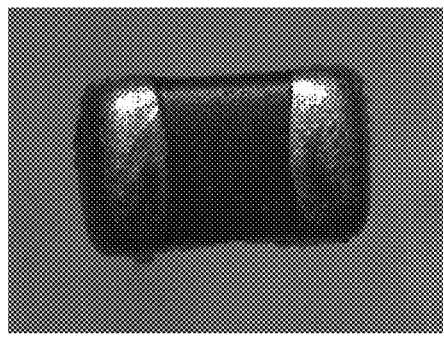
FIG. 4 is the corrected image of the FIG. 2A corrected by the method recited in the present invention according to the preferred embodiment of the present invention.

The FIG. 3 is the corrected image of the FIG. 1A corrected by the method recited in the present invention, the FIG. 4 is the corrected image of the FIG. 2A corrected by the method recited in the present invention. It is illustrated by the FIG. 3 and the FIG. 4 that the color of the uncorrected image is sufficiently corrected to the color of the reference image, while texture information of the uncorrected image is well kept.

Figure 5:
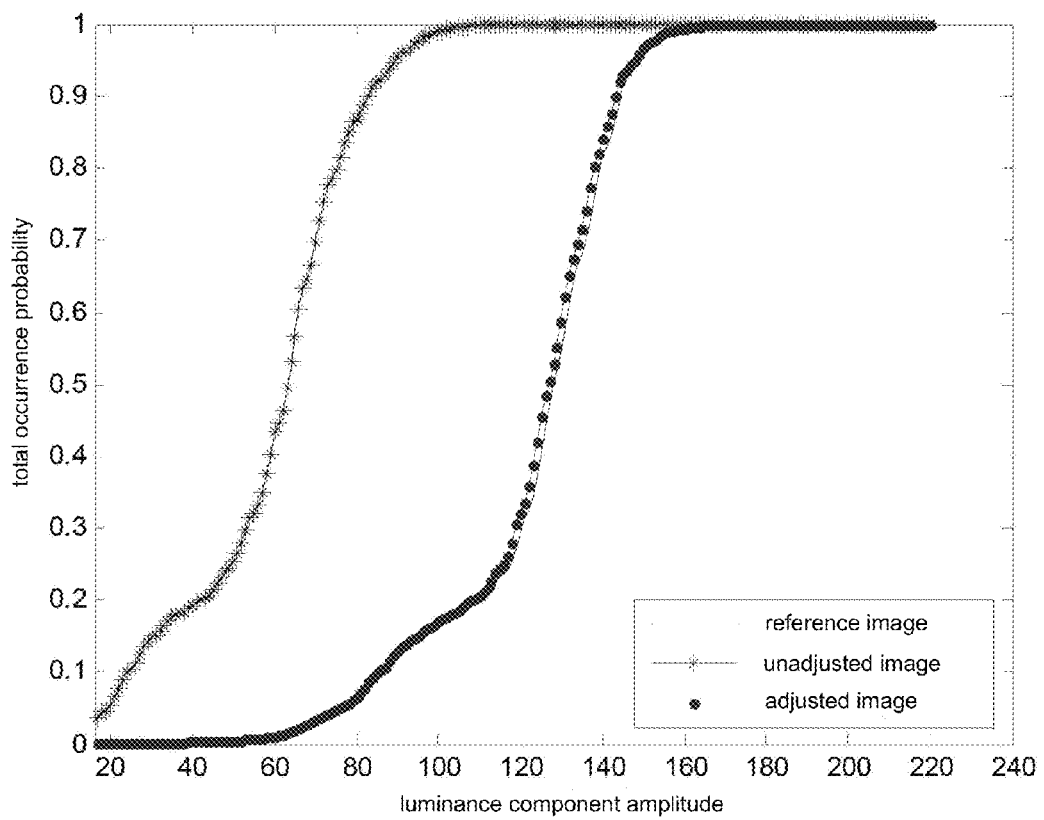
FIG. 5 shows cumulative histograms of luminance component of the FIG. 1A, FIG. 1B and FIG. 3 according to the preferred embodiment of the present invention.
Figure 6:
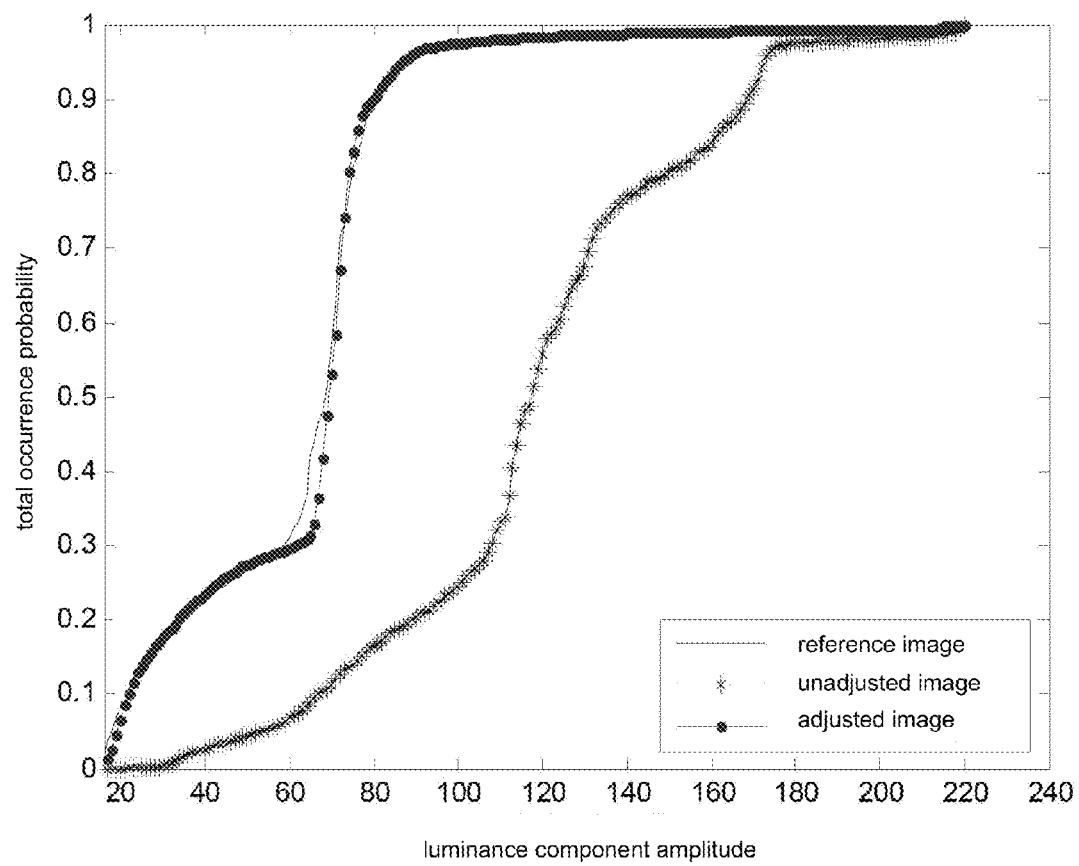
FIG. 6 shows cumulative histograms of luminance component of the FIG. 2A, FIG. 2B and FIG. 4 according to the preferred embodiment of the present invention.

The FIG. 5 shows the cumulative histograms of luminance component of the FIG. 1A, FIG. 1B and FIG. 3, the FIG. 6 shows the cumulative histograms of luminance component of the FIG. 2A, FIG. 2B and FIG. 4. It is illustrated by the FIG. 5 and the FIG. 6 that the cumulative histogram of luminance component of the corrected image almost overlaps with the cumulative histogram of luminance component of the reference image. Since the cumulative histogram well illustrates distribution of the color information, the overlapping cumulative histograms indicates that the color distribution of the reference image and corrected image are almost the same. By contrast, the color distribution shown by the cumulative histograms of the uncorrected image and the reference image has evident difference. The method transmits the color information of the reference image to the uncorrected image, thus illustrates efficiency and feasibility of the present invention.

One skilled in the art will understand that the embodiment of the present invention as shown in the drawings and described above is exemplary only and not intended to be limiting.

It will thus be seen that the objects of the present invention have been fully and effectively accomplished. Its embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A method for color correction of a pair of colorful stereo microscope images, comprising steps of:
    a) taking a first image of a pair of the colorful stereo microscope images in the RGB color space as a reference image $I^{ref}$, and taking a second image of the pair of the colorful stereo microscope images in the RGB color space as an uncorrected image $I^{sou}$;
    b) obtaining a first saliency map of the reference image $I^{ref}$ and a second saliency map of the uncorrected image $I^{sou}$, wherein the first saliency map is marked as SaliencyMap$^{ref}$ and the second saliency map is marked as SaliencyMap$^{sou}$; obtaining a first segmentation map of the reference image $I^{ref}$ and a second segmentation map of the uncorrected image $I^{sou}$ with the first saliency map of the reference image $I^{ref}$ and the second saliency map of the uncorrected image $I^{sou}$ respectively, wherein the first segmentation map is marked as BMap$^{ref}$ and the second segmentation map is marked as BMap$^{sou}$, wherein the BMap$^{ref}$ and the BMap$^{sou}$ all comprise a plurality of foreground areas, the i'th foreground area of the BMap$^{ref}$ is marked as BMap$_i^{refi}$, and the i'th foreground area of the BMap$^{sou}$ is marked as BMap$_i^{sou}$, wherein, 1≤i'≤I', the I' is the number of the foreground areas of the BMap$^{ref}$ or the BMap$^{sou}$;

c) calculating histograms, normalized histograms and cumulative histograms of a luminance component Y, a first chroma component Cb and a second chroma component Cr for each the foreground area of the BMap$^{ref}$ in the YCbCr color space, and calculating the histograms, the normalized histograms and the cumulative histograms of the luminance component Y, the first chroma component Cb and the second chroma component Cr for each the foreground area of the BMap$^{sou}$ in the YCbCr color space;

d) calculating color histograms for each the foreground area of the BMap$^{ref}$ and the BMap$^{sou}$ in the RGB color space;

e) for each the foreground area of the BMap$^{ref}$, calculating a similarity value of the color histogram of the foreground area of the BMap$^{ref}$ and the color histogram of the corresponding foreground area of the BMap$^{sou}$, and judging whether the foreground area of the BMap$^{ref}$ is matching with the corresponding foreground area of the BMap$^{sou}$ or not from the similarity value of the color histograms of the two matching foreground areas;

f) for each pair of the foreground area of the BMap$^{ref}$ and the matched foreground area of the BMap$^{sou}$, calculating transfer functions with respect to a luminance component Y, a first chroma component Cb and a second chroma component Cr of the pair, and correcting the luminance component Y, the first chroma component Cb and the second chroma component Cr of the area of the uncorrected image I$^{sou}$ corresponding to the matched foreground area of the BMap$^{sou}$ according to the transfer functions with respect to the luminance component, the first chroma component and the second chroma component of the foreground area of the BMap$^{ref}$ and the matched foreground area of the BMap$^{sou}$;

g) calculating the histograms, the normalized histograms and the cumulative histograms of the luminance component Y, the first chroma component Cb and the second chroma component Cr of the background area of the BMap$^{ref}$ in the YCbCr color space, and calculating the histograms, the normalized histograms and the cumulative histograms of the luminance component Y, the first chroma component Cb and the second chroma component Cr of the background area of the BMap$^{sou}$ in the YCbCr color space;

h) calculating transfer functions with respect to the luminance component, the first chroma component and the second chroma component of the background area of the BMap$^{ref}$ and the background area of the BMap$^{sou}$, and correcting the luminance component Y, the first chroma component Cb and the second chroma component Cr of the area of the uncorrected image I$^{sou}$ corresponding to the background area of the BMap$^{sou}$ according to the transfer functions with respect to the luminance component, the first chroma component and the second chroma component of the background areas of the BMap$^{ref}$ and the BMap$^{sou}$; and i) combining the luminance component, the first chroma component and the second chroma component of each corrected area of the uncorrected image for obtaining an corrected image.

2. The method, as recited in claim 1, wherein for obtaining the first saliency map of the reference image I$^{ref}$ and the second saliency map of the uncorrected image I$^{sou}$, the step b) specifically comprises steps of:

b-a1) respectively re-quantifying color values of a R, a G and a B channel of the reference image I$^{ref}$ into M levels for obtaining an initial quantified image corresponding to the reference image I$^{ref}$, wherein the initial quantified image has M$^3$ kinds of color;

b-a2) calculating an occurrence probability of each the color of the initial quantified image for obtaining the color histogram thereof, marking the occurrence probability of the ith color $C_i$ as $P_i$, wherein, $1 \le i \le M^3$;

b-a3) replacing the color whose the occurrence probability is lower than a constant threshold T with the next color in the color histogram of the initial quantified image for obtaining a final quantified image corresponding to the reference image I$^{ref}$, wherein the final quantified image has L kinds of color, wherein for the ith color $C_i$ in the initial quantified image, judging whether $P_i < T$ or not, if yes, replacing the ith color $C_i$ in the initial quantified image with the i+1th color $C_{i+1}$ or the i−1th color $C_{i-1}$ next to the $C_i$ in the color histogram, if no, keeping the ith color $C_i$ in the initial quantified image, wherein $L \le M^3$;

b-a4) calculating a saliency value of each the color of the final quantified image for obtaining the first saliency map of the reference image I$^{ref}$, marking the first saliency map as SaliencyMap$^{ref}$, the values of which are the saliency value, and marking the saliency value of the kth color $C_k'$ of the final quantified image as Sal($C_k'$), $$Sal(C_k') = \sum_{C_j' \in I_q} f(C_j') \times D(C_k', C_j'),$$

wherein $1 \le k \le L$, $1 \le j \le L$, $C_j'$ is the jth color of the final quantified image, $I_q$ is all the colors of the final quantified image, $f(C_j')$ is the occurrence probability of the $C_j'$ in the final quantified image, $D(C_k', C_j')$ is a distance between the $C_k'$ and the $C_j'$ in the lαβ color space after the $C_k'$ and the $C_j'$ are transformed to the lαβ color space; and b-a5) obtaining the SaliencyMap$^{sou}$ of the uncorrected image I$^{sou}$ by the same method as recited in the step b-a1) to the step b-a4) for obtaining the SaliencyMap$^{ref}$ of the reference image I$^{ref}$.

3. The method, as recited in claim 2, wherein in the step b-a1), M=12, the constant threshold T in the step b-a3) is 0.05 times of the number of the pixels of the reference image I$^{ref}$ or the uncorrected image I$^{sou}$.

4. The method, as recited in claim 1, wherein for obtaining the first segmentation map of the reference image I$^{ref}$ and the second segmentation map of the uncorrected image I$^{sou}$, the step b) specifically comprises steps of:

b-c1) defining a constant threshold $T_f$ and thresholding the SaliencyMap$^{ref}$ of the reference image I$^{ref}$ by utilizing the constant threshold $T_f$ for obtaining a binary image thereof, wherein the binary image is marked as B$^{ref}$, wherein $T_f \in [0,255]$, and the value 255 of the B$^{ref}$ marks the foreground area, and the value 0 of the B$^{ref}$ marks the background area;

b-c2) obtaining a plurality of initial foreground areas and initial background areas of the reference image $I^{ref}$ by utilizing a pixel value of each the pixel in the $B^{ref}$, wherein each the pixel in the initial foreground areas of the reference image $I^{ref}$ is corresponding to the pixel with the pixel value of 255 in the $B^{ref}$, each the pixel in the initial background areas of the reference image $I^{ref}$ is corresponding to the pixel with the pixel value of 0 in the $B^{ref}$;

b-c3) taking the ith initial foreground area of the $I^{ref}$ under treating as a present foreground area $Trimap_i$, wherein, $1 \le i \le I$, I is the number of the initial foreground areas of the reference image $I^{ref}$;

b-c4) denoting an area of $B^{ref}$ corresponding to the $Trimap_i$ as $B_i^{ref}$, marking a min X axis position, a max X axis position, a min Y axis position and a max Y axis position of the pixels in the area $B_i^{ref}$ as $miX_i$, $maX_i$, $miY_i$ and $maY_i$;

b-c5) enlarging the $B_i^{ref}$ to a rectangle area, marking the rectangle area as $B_i^{refi}$, and marking the min X axis position, the max X axis position, the min Y axis position and the max Y axis position of the pixels in the $B_i^{refi}$ as $miX_i'$, $maX_i'$, $miY_i'$ and $maY_i'$, wherein $$miX_i' = \begin{cases} miX_i - 0.5 \times (maX_i - miX_i), & \text{if } miX_i - 0.5 \times (maX_i - miX_i) \ge 0 \\ 0, & \text{if } miX_i - 0.5 \times (maX_i - miX_i) < 0 \end{cases},$$

$$maX_i' = \begin{cases} maX_i + 0.5 \times (maX_i - miX_i), & \text{if } maX_i + 0.5 \times (maX_i - miX_i) < W \\ W - 1, & \text{if } maX_i + 0.5 \times (maX_i - miX_i) \ge W \end{cases},$$

$$miY_i' = \begin{cases} miY_i - 0.5 \times (maY_i - miY_i), & \text{if } miY_i - 0.5 \times (maY_i - miY_i) \ge 0 \\ 0, & \text{if } miY_i - 0.5 \times (maY_i - miY_i) < 0 \end{cases},$$

$$maY_i' = \begin{cases} maY_i + 0.5 \times (maY_i - miY_i), & \text{if } maY_i + 0.5 \times (maY_i - miY_i) < H \\ H - 1, & \text{if } maY_i + 0.5 \times (maY_i - miY_i) \ge H, \end{cases}$$

wherein the W is a width of the $B^{ref}$, the H is a height of the $B^{ref}$;

b-c6) enlarging the present foreground area $Trimap_i$ to the rectangle area with the same position as the $B_i^{refi}$, wherein the area is marked as $Trimap_i'$; for each the pixel in the $Trimap_i'$, judging whether the pixel in the $Trimap_i'$ belongs to the foreground area or the background area according to the pixel value of the corresponding pixel in the $B_i^{refi}$, wherein for the pixel having the position of (x,y) in the $Trimap_i'$, judging whether the pixel value of the pixel having the position of (x,y) in the $B_i^{refi}$ is 255 or not, if yes, the pixel having the position of (x,y) in the $Trimap_i'$ belongs to the foreground area, if no, the pixel having the position of (x,y) in the $Tramp_i'$ belongs to the background area, wherein, $0 \le x \le W_i$, $0 \le y \le H_i$, the $W_i$ is a width of the $B_i^{refi}$ and the $Trimap_i'$, $W_i = maX_i' - miX_i'$, the $H_i$ is a height of the $B_i^{refi}$ and the $Trimap_i'$, $H_i = maY_i' - miY_i'$;

b-c7) letting $miX_i = miX_i'$, $maX_i = maX_i'$, $miY_i = miY_i'$ and $maY_i = maY_i'$, and taking the $B_i^{refi}$ as the new untreated rectangle area $B_i^{ref}$, taking the $Trimap_i'$ as the new present foreground area $Trimap_i$, repeating the step b-c5) to the step b-c7) again and circularly, judging whether the number of the pixels in the foreground area of the $Trimap_i'$ after repeating K times is equal to the number of the pixels in the foreground of the $Trimap_i'$ after repeating K-1 times, if yes, segmenting the $Trimap_i'$ with a GrabCut method for obtaining a final foreground area and a final background area of the $Trimap_i'$, if no, repeating the step b-c5) to the step b-c7) again, wherein the "=" is an assignment symbol, an initial value of the K is 1;

b-c8) letting i=i+1, wherein the "=" is the assignment symbol, taking the next untreated initial foreground area of the reference image $I^{ref}$ as the present foreground area $Trimap_1$, repeating the step b-c4) to the step b-c8) again and circularly until all the initial foreground areas of the reference image $I^{ref}$ are treated for obtaining the first segmentation map $BMap^{ref}$ of the reference image $I^{ref}$, marking the i'th foreground area of the $BMap^{ref}$ as $BMap_{i'}^{ref}$, $1 \le i' \le I'$, wherein the I' is the number of the foreground areas of the $BMap^{ref}$; and b-c9) obtaining the $BMap^{sou}$ of the uncorrected image $I^{sou}$ by the same method as recited in the step b-c1) to the step b-c8) for obtaining the $BMap^{ref}$ of the reference image $I^{ref}$, marking the i'th foreground area of the $BMap^{sou}$ as $BMap_{i'}^{sou}$, wherein, $1 \le i' \le I'$, the I' is the number of the foreground areas of the $BMap^{sou}$.

5. The method, as recited in claim 2, wherein for obtaining the first segmentation map of the reference image $I^{ref}$ and the second segmentation map of the uncorrected image $I^{sou}$, the step b) specifically comprises steps of:

b-c1) defining a constant threshold $T_f$, and thresholding the $SaliencyMap^{ref}$ of the reference image $I^{ref}$ by utilizing the constant threshold $T_f$ for obtaining a binary image thereof, wherein the binary image is marked as $B^{ref}$, wherein $T_f \in [0,255]$, and the value 255 of the $B^{ref}$ marks the foreground area, and the value 0 of the $B^{ref}$ marks the background area;

b-c2) obtaining a plurality of initial foreground areas and initial background areas of the reference image $I^{ref}$ by utilizing a pixel value of each the pixel in the $B^{ref}$, wherein each the pixel in the initial foreground areas of the reference image $I^{ref}$ is corresponding to the pixel with the pixel value of 255 in the $B^{ref}$, each the pixel in the initial background areas of the reference image $I^{ref}$ is corresponding to the pixel with the pixel value of 0 in the $B^{ref}$;

b-c3) taking the ith initial foreground area of the $I^{ref}$ under treating as a present foreground area $Trimap_i$, wherein, $1 \le i \le I$, I is the number of the initial foreground areas of the reference image $I^{ref}$;

b-c4) denoting an area of $B^{ref}$ corresponding to the $Trimap_i$ as $B_i^{ref}$, marking a min X axis position, a max X axis position, a min Y axis position and a max Y axis position of the pixels in the area $B_i^{ref}$ as $miX_i$, $maX_i$, $miY_i$ and $maY_i$;

b-c5) enlarging the $B_i^{ref}$ to a rectangle area, marking the rectangle area as $B_i^{refi}$, and marking the min X axis position, the max X axis position, the min Y axis position and the max Y axis position of the pixels in the $B_i^{refi}$ as $miX_i'$, $maX_i'$, $miY_i'$ and $maY_i'$, wherein $$miX_i' = \begin{cases} miX_i - 0.5 \times (maX_i - miX_i), & \text{if } miX_i - 0.5 \times (maX_i - miX_i) \ge 0 \\ 0, & \text{if } miX_i - 0.5 \times (maX_i - miX_i) < 0 \end{cases},$$

$$maX_i' = \begin{cases} maX_i + 0.5 \times (maX_i - miX_i), & \text{if } maX_i + 0.5 \times (maX_i - miX_i) < W \\ W - 1, & \text{if } maX_i + 0.5 \times (maX_i - miX_i) \ge W \end{cases},$$

-continued $$miY'_i = \begin{cases} miY_i - 0.5 \times (maY_i - miY_i), & \text{if } miY_i - 0.5 \times (maY_i - miY_i) \geq 0 \\ 0, & \text{if } miY_i - 0.5 \times (maY_i - miY_i) < 0 \end{cases},$$

$$maY'_i = \begin{cases} maY_i + 0.5 \times (maY_i - miY_i), & \text{if } maY_i + 0.5 \times (maY_i - miY_i) < H \\ H - 1 & \text{if } maY_i + 0.5 \times (maY_i - miY_i) \geq H, \end{cases}$$

wherein the W is a width of the $B^{ref}$, the H is a height of the $B^{ref}$;

b-c6) enlarging the present foreground area $Trimap_i$ to the rectangle area with the same position as the $B_i^{refi}$, wherein the area is marked as $Trimap_i'$; for each the pixel in the $Trimap_i'$, judging whether the pixel in the $Trimap_i'$ belongs to the foreground area or the background area according to the pixel value of the corresponding pixel in the $B_i^{refi}$, wherein for the pixel having the position of (x,y) in the $Trimap_i'$, judging whether the pixel value of the pixel having the position of (x,y) in the $B_i^{refi}$ is 255 or not, if yes, the pixel having the position of (x,y) in the $Trimap_i'$ belongs to the foreground area, if no, the pixel having the position of (x,y) in the $Trimap_i'$ belongs to the background area, wherein, $0 \leq x \leq W_i$, $0 \leq y \leq H_i$, the $W_i$ is a width of the $B_i^{refi}$ and the $Trimap_i'$, $W_i' = maX_i' - miX_i'$, the $H_i$ is a height of the $B_i^{refi}$ and the $Trimap_i'$, $H_i = maY_i' - miY_i'$;

b-c7) letting $miX_i' = miX_i'$, $maX_i' = maX_i'$, $miY_i' = miY_i'$ and $maY_i' = maY_i'$, and taking the $B_i^{refi}$ as the new untreated rectangle area $B_i^{ref}$, taking the $Trimap_i'$ as the new present foreground area $Trimap_i$, repeating the step b-c5) to the step b-c7) again and circularly, judging whether the number of the pixels in the foreground area of the $Trimap_i'$ after repeating K times is equal to the number of the pixels in the foreground of the $Trimap_i'$ after repeating K-1 times, if yes, segmenting the $Trimap_i'$ with a GrabCut method for obtaining a final foreground area and a final background area of the $Trimap_i'$, if no, repeating the step b-c5) to the step b-c7) again, wherein the "=" is an assignment symbol, an initial value of the K is 1;

b-c8) letting i=i+1, wherein the "=" is the assignment symbol, taking the next untreated initial foreground area of the reference image $I^{ref}$ as the present foreground area $Trimap_i$, repeating the step b-c4) to the step b-c8) again and circularly until all the initial foreground areas of the reference image $I^{ref}$ are treated for obtaining the first segmentation map $BMap^{ref}$ of the reference image $I^{ref}$, marking the i'th foreground area of the $BMap^{ref}$ as $BMap_{i'}^{refi}$, $1 \leq i' \leq I'$, wherein the I' is the number of the foreground areas of the $BMap^{ref}$; and b-c9) obtaining the $BMap^{sou}$ of the uncorrected image $I^{sou}$ by the same method as recited in the step b-c1) to the step b-c8) for obtaining the $BMap^{ref}$ of the reference image $I^{ref}$, marking the i'th foreground area of the $BMap^{sou}$ as $BMap_{i'}^{sou_n}$, wherein, $1 \leq i' \leq I'$, the I' is the number of the foreground areas of the $BMap^{sou}$.

6. The method, as recited in claim 3, wherein for obtaining the first segmentation map of the reference image $I^{ref}$ and the second segmentation map of the uncorrected image $I^{sou}$, the step b) specifically comprises steps of:

b-c1) defining a constant threshold $T_f$, and thresholding the $SaliencyMap^{ref}$ of the reference image $I^{ref}$ by utilizing the constant threshold $T_f$ for obtaining a binary image thereof, wherein the binary image is marked as $B^{ref}$, wherein $T_f \in [0,255]$, and the value 255 of the $B^{ref}$ marks the foreground area, and the value 0 of the $B^{ref}$ marks the background area;

b-c2) obtaining a plurality of initial foreground areas and initial background areas of the reference image $I^{ref}$ by utilizing a pixel value of each pixel in the $B^{ref}$, wherein each the pixel in the initial foreground areas of the reference image $I^{ref}$ is corresponding to the pixel with the pixel value of 255 in the $B^{ref}$, each the pixel in the initial background areas of the reference image $I^{ref}$ is corresponding to the pixel with the pixel value of 0 in the $B^{ref}$;

b-c3) taking the ith initial foreground area of the $I^{ref}$ under treating as a present foreground area $Trimap_i$, wherein, $1 \leq i \leq I$, I is the number of the initial foreground areas of the reference image $I^{ref}$;

b-c4) denoting an area of $B^{ref}$ corresponding to the $Trimap_i$ as $B_i^{ref}$, marking a min X axis position, a max X axis position, a min Y axis position and a max Y axis position of the pixels in the area $B_i^{ref}$ as $miX_i$, $maX_i$, $miY_i$ and $maY_i$;

b-c5) enlarging the $B_i^{ref}$ to a rectangle area, marking the rectangle area as $B_i^{refi}$, and marking the min X axis position, the max X axis position, the min Y axis position and the max Y axis position of the pixels in the $B_i^{refi}$ as $miX_i'$, $maX_i'$, $miY_i'$ and $maY_i'$, wherein $$miX'_i = \begin{cases} miX_i - 0.5 \times (maX_i - miX_i), & \text{if } miX_i - 0.5 \times (maX_i - miX_i) \geq 0 \\ 0, & \text{if } miX_i - 0.5 \times (maX_i - miX_i) < 0 \end{cases},$$

$$maX'_i = \begin{cases} maX_i + 0.5 \times (maX_i - miX_i), & \text{if } maX_i + 0.5 \times (maX_i - miX_i) < W \\ W - 1, & \text{if } maX_i + 0.5 \times (maX_i - miX_i) \geq W \end{cases},$$

$$miY'_i = \begin{cases} miY_i - 0.5 \times (maY_i - miY_i), & \text{if } miY_i - 0.5 \times (maY_i - miY_i) \geq 0 \\ 0, & \text{if } miY_i - 0.5 \times (maY_i - miY_i) < 0 \end{cases},$$

$$maY'_i = \begin{cases} maY_i + 0.5 \times (maY_i - miY_i), & \text{if } maY_i + 0.5 \times (maY_i - miY_i) < H \\ H - 1 & \text{if } maY_i + 0.5 \times (maY_i - miY_i) \geq H, \end{cases}$$

wherein the W is a width of the $B^{ref}$, the H is a height of the $B^{ref}$;

b-c6) enlarging the present foreground area $Trimap_i$ to the rectangle area with the same position as the $B_i^{refi}$, wherein the area is marked as $Trimap_i$; for each the pixel in the $Trimap_i'$, judging whether the pixel in the $Trimap_i'$ belongs to the foreground area or the background area according to the pixel value of the corresponding pixel in the $B_i^{refi}$, wherein for the pixel having the position of (x,y) in the $Trimap_i'$, judging whether the pixel value of the pixel having the position of (x,y) in the $B_i^{refi}$ is 255 or not, if yes, the pixel having the position of (x,y) in the $Trimap_i'$ belongs to the foreground area, if no, the pixel having the position of (x,y) in the $Trimap_i'$ belongs to the background area, wherein, $0 \leq x \leq W_i$, $0 \leq y \leq H_i$, the $W_i$ is a width of the $B_i^{refi}$ and the $Trimap_i'$, $W_i = maX_i' - miX_i'$, the $H_i$ is a height of the $B_i^{refi}$ and the $Trimap_i'$, $H_i = maY_i' - miY_i'$;

b-c7) letting $miX_i = miX_i'$, $maX_i = maX_i'$, $miY_i = miY_i'$ and $maY_i = maY_i'$, and taking the $B_i^{refi}$ as the new untreated rectangle area $B_i^{ref}$, taking the $Trimap_i'$ as the new present foreground area $Trimap_i$, repeating the step b-c5) to the step b-c7) again and circularly, judging whether the number of the pixels in the foreground area of the Trimap$_i'$ after repeating K times is equal to the number of the pixels in the foreground of the Trimap$_i'$ after repeating K−1 times, if yes, segmenting the Trimap$_i'$ with a GrabCut method for obtaining a final foreground area and a final background area of the Trimap$_i'$, if no, repeating the step b-c5) to the step b-c7) again, wherein the "=" is an assignment symbol, an initial value of the K is 1;

b-c8) letting i=i+1, wherein the "=" is the assignment symbol, taking the next untreated initial foreground area of the reference image I$^{ref}$ as the present foreground area Trimap$_i$, repeating the step b-c4) to the step b-c8) again and circularly until all the initial foreground areas of the reference image I$^{ref}$ are treated for obtaining the first segmentation map BMap$^{ref}$ of the reference image I$^{ref}$, marking the i'th foreground area of the BMap$^{ref}$ as BMap$_i'^{refi}$, 1≤i'≤I', wherein the I' is the number of the foreground areas of the BMap$^{ref}$; and b-c9) obtaining the BMap$^{sou}$ of the uncorrected image I$^{sou}$ by the same method as recited in the step b-c1) to the step b-c8) for obtaining the BMap$^{ref}$ of the reference image ref, marking the i'th foreground area of the BMap$^{sou}$ as BMap$_i'^{sou}$, wherein, 1≤i'≤I', the I' is the number of the foreground areas of the BMap$^{sou}$.

7. The method, as recited in claim 4, wherein when obtaining the first segmentation map BMap$^{ref}$ of the reference image $_{ref}$, the constant threshold T$_f$ in the step b-c1) is 2 times of the average pixel value of all the pixels of the SaliencyMap$^{ref}$ of the reference image I$^{ref}$, when obtaining the second segmentation map BMap$^{sou}$ of the uncorrected image I$^{sou}$, the constant threshold T$_f$ in the step corresponding to step b-c1) is 2 times of the average pixel value of all the pixels of the SaliencyMap$^{sou}$ of the uncorrected image I$^{sou}$; in the step b-c7), K=4.

8. The method, as recited in claim 5, wherein when obtaining the first segmentation map BMap$^{ref}$ of the reference image I$^{ref}$, the constant threshold T$_f$ in the step b-c1) is 2 times of the average pixel value of all the pixels of the SaliencyMap$^{ref}$ of the reference image ref, when obtaining the second segmentation map BMap$^{sou}$ of the uncorrected image I$^{sou}$, the constant threshold T$_f$ in the step corresponding to step b-c1) is 2 times of the average pixel value of all the pixels of the SaliencyMap$^{sou}$ of the uncorrected image I$^{sou}$; in the step b-c7), K=4.

9. The method, as recited in claim 6, wherein when obtaining the first segmentation map BMap$^{ref}$ of the reference image I$^{ref}$, the constant threshold T$_f$ in the step b-c1) is 2 times of the average pixel value of all the pixels of the SaliencyMap$^{ref}$ of the reference image I$^{ref}$, when obtaining the second segmentation map BMap$^{sou}$ of the uncorrected image I$^{sou}$, the constant threshold T$_f$ in the step corresponding to step b-c1) is 2 times of the average pixel value of all the pixels of the SaliencyMap$^{sou}$ of the uncorrected image I$^{sou}$; in the step b-c7), K=4.

10. The method, as recited in claim 4, wherein the step c) specifically comprises steps of:

c-1) taking the i'th foreground area BMap$_i'^{refi}$ under treating of the BMap$^{ref}$ as the present foreground area, wherein, 1≤i'≤I', the I' is the number of the foreground areas of the BMap$^{ref}$;

c-2) calculating the histograms of the luminance component Y, the first chroma component Cb and the second chroma component Cr of the BMap$_i'^{refi}$: denoting the histogram of the luminance component Y of the BMap$_i'^{refi}$ as H$_{i'}^{Y\_ref}$(u), $$H_{i'}^{Y\_ref}(u) = \sum_{(x',y') \in BMap_{i'}^{ref}} \delta[u, Y(x', y')],$$

wherein Y(x',y') is the value of the luminance component of the pixel at the position of (x',y') in the BMap$_i'^{refi}$, $$\delta[u, Y(x', y')] = \begin{cases} 1, & \text{if } u = Y(x', y') \\ 0, & \text{if } u \neq Y(x', y'), \end{cases}$$

denoting the histogram of the first chroma component Cb of the BMap$_i'^{refi}$ as H$_{i'}^{Cb\_ref}$(u), $$H_{i'}^{Cb\_ref}(u) = \sum_{(x',y') \in BMap_{i'}^{ref}} \delta[u, Cb(x', y')],$$

wherein Cb(x',y') is the value of the first chroma component of the pixel at the position of (x',y') in the BMap$_i'^{refi}$, $$\delta[u, Cb(x', y')] = \begin{cases} 1, & \text{if } u = Cb(x', y') \\ 0, & \text{if } u \neq Cb(x', y'), \end{cases}$$

denoting the histogram of the second chroma component Cr of the BMap$_i'^{refi}$ as H$_{i'}^{Cr\_ref}$(u), $$H_{i'}^{Cb\_ref}(u) = \sum_{(x',y') \in BMap_{i'}^{ref}} \delta[u, Cr(x', y')],$$

wherein Cr(x',y') is the value of the second chroma component of the pixel at the position of (x',y') in the BMap$_i'^{refi}$, $$\delta[u, Cr(x', y')] = \begin{cases} 1, & \text{if } u = Cr(x', y') \\ 0, & \text{if } u \neq Cr(x', y'), \end{cases}$$

wherein u∈[0,255];

c-3) calculating the normalized histograms of the luminance component Y, the first chroma component Cb and the second chroma component Cr of the BMap$_i'^{refi}$: denoting the normalized histogram of the luminance component Y of the BMap$_i'^{refi}$ as H$_{i'}^{Y\_Norm\_ref}$(u), H$_{i'}^{Y\_Norm\_ref}$(u)=H$_{i'}^{Cb\_ref}$(u)/PixelCount$_{i'}$, denoting the normalized histogram of the first chroma component Cb of the BMap$_i'^{refi}$, as H$_{i'}^{Cb\_ref}$(u), H$_{i'}^{Cb\_Norm\_hu\ ref}$(u)= H$_{i'}^{Cb\_ref}$(u)/PixelCount$_{i'}$, denoting the normalized histogram of the second chroma component Cr of the BMap$_i'^{refi}$ as H$_{i'}^{Cr\_Norm\_ref}$(u), H$_{i'}^{Cr\_Norm\_ref}$(u)= H$_{i'}^{Cr\_ref}$(u)/PixelCount$_{i'}$, wherein u∈[0,255], and the PixelCount$_{i'}$ is the number of the pixels in the present foreground area BMap$_i'^{refi}$;

c-4) calculating the cumulative histograms of the luminance component Y, the first chroma component Cb and the second chroma component Cr of the BMap$_i'^{refi}$: denoting the cumulative histogram of the luminance component Y of the BMap$_i'^{refi}$ as H$_{i'}^{Y\_Cum\_ref}$(u), $$H_{i'}^{Y\_Cum\_ref}(u) = \sum_{j=0}^{u} H_{i'}^{Y\_Norm\_ref}(j),$$

denoting the cumulative histogram of the first chroma component Cb of the BMap$_{i'}^{refi}$ as H$^{Cb\_Cum\_ref}$(u), $$H_{i'}^{Cb\_Cum\_ref}(u) = \sum_{j=0}^{u} H_{i'}^{CB\_Norm\_ref}(j),$$

denoting the cumulative histogram of the second chroma component Cr of the BMap$_{i'}^{refi}$ as H$_{i'}^{Cr\_Cum\_ref}$(u), $$H_{i'}^{Cr\_Cum\_ref}(u) = \sum_{j=0}^{u} H_{i'}^{Cr\_Norm\_ref}(j),$$

wherein u∈[0,255];

c-5) letting i'=i'+1, taking the next untreated foreground area of the BMap$^{ref}$ as the present foreground area, repeating the step c-2) to the step c-5) again and circularly until all the foreground areas of the BMap$^{ref}$ are treated, wherein the "=" is the assignment symbol; and c-6) calculating the histograms, the normalized histograms and the cumulative histograms of the luminance component Y, the first chroma component Cb and the second chroma component Cr of each the foreground area of the BMap$^{sou}$ by the same method as recited in the step c-1) to the step c-5).

11. The method, as recited in claim 5, wherein the step c) specifically comprises steps of:

c-1) taking the i'th foreground area BMap$_{i'}^{refi}$ under treating of the BMap$^{ref}$ as the present foreground area, wherein, 1≤i'≤I', the I' is the number of the foreground areas of the BMap$^{ref}$;

c-2) calculating the histograms of the luminance component Y, the first chroma component Cb and the second chroma component Cr of the BMap$_{i'}^{refi}$: denoting the histogram of the luminance component Y of the BMap$_{i'}^{refi}$ as H$_{i'}^{Y\_ref}$(u), $$H_{i'}^{Y\_ref}(u) = \sum_{(x',y') \in BMap_{i'}^{ref}} \delta[u, Y(x', y')],$$

wherein Y(x',y') is the value of the luminance component of the pixel at the position of (x',y') in the BMap$_{i'}^{refi}$, $$\delta[u, Y(x', y')] = \begin{cases} 1, & \text{if } u = Y(x', y') \\ 0, & \text{if } u \neq Y(x', y'), \end{cases}$$

denoting the histogram of the first chroma component Cb of the BMap$_{i'}^{refi}$ as H$_{i'}^{Cb\_ref}$(u), $$H_{i'}^{Cb\_ref}(u) = \sum_{(x',y') \in BMap_{i'}^{ref}} \delta[u, Cb(x', y')],$$

wherein Cb(x',y') is the value of the first chroma component of the pixel at the position of (x',y') in the BMap$_{i'}^{refi}$, $$\delta[u, Cb(x', y')] = \begin{cases} 1, & \text{if } u = Cb(x', y') \\ 0, & \text{if } u \neq Cb(x', y'), \end{cases}$$

denoting the histogram of the second chroma component Cr of the BMap$_{i'}^{refi}$ as H$_{i'}^{Cr\_ref}$(u)

$$H_{i'}^{Cr\_ref}(u) = \sum_{(x',y') \in BMap_{i'}^{ref}} \delta[u, Cr(x', y')],$$

wherein Cr(x',y') is the value of the second chroma component of the pixel at the position of (x',y') in the BMap$_{i'}^{refi}$, $$\delta[u, Cr(x', y')] = \begin{cases} 1, & \text{if } u = Cr(x', y') \\ 0, & \text{if } u \neq Cr(x', y'), \end{cases}$$

wherein u∈[0,255];

c-3) calculating the normalized histograms of the luminance component Y, the first chroma component Cb and the second chroma component Cr of the BMap$_{i'}^{refi}$: denoting the normalized histogram of the luminance component Y of the BMap$_{i'}^{refi}$ as H$_{i'}^{Y\_Norm\_ref}$(u), H$_{i'}^{Y\_Norm\_ref}$(u)=H$_{i'}^{Y\_ref}$(u)/PixelCount$_{i'}$, denoting the normalized histogram of the first chroma component Cb of the BMap$_{i'}^{refi}$ as H$_{i'}^{Cb\_Norm\_ref}$(u), H$_{i'}^{Cb\_Norm\_hu\ ref}$(u)=H$_{i'}^{Cb\_ref}$(u)/PixelCount$_{i'}$, denoting the normalized histogram of the second chroma component Cr of the BMap$_{i'}^{refi}$ as H$_{i'}^{Cr\_Norm\_ref}$(u), H$_{i'}^{Cr\_Norm\_ref}$(u)= H$_{i'}^{Cr\_ref}$(u)/PixelCount$_{i'}$, wherein u∈[0,255], and the PixelCount$_{i'}$ is the number of the pixels in the present foreground area BMap$_{i'}^{refi}$;

c-4) calculating the cumulative histograms of the luminance component Y, the first chroma component Cb and the second chroma component Cr of the BMap$_{i'}^{refi}$: denoting the cumulative histogram of the luminance component Y of the BMap$_{i'}^{refi}$ as H$_{i'}^{Y\_Cum\_ref}$(u), $$H_{i'}^{Y\_Cum\_ref}(u) = \sum_{j=0}^{u} H_{i'}^{Y\_Norm\_ref}(j),$$

denoting the cumulative histogram of the first chroma component Cb of the BMap$_{i'}^{refi}$ as H$^{Cr\_Cum\_ref}$(u), $$H_{i'}^{Cb\_Cum\_ref}(u) = \sum_{j=0}^{u} H_{i'}^{Cb\_Norm\_ref}(j),$$

denoting the cumulative histogram of the second chroma component Cr of the BMap$_{i'}^{refi}$ as H$_{i'}^{Cr\_Cum\_ref}$(u), $$H_{i'}^{Cr\_Cum\_ref}(u) = \sum_{j=0}^{u} H_{i'}^{Cr\_Norm\_ref}(j),$$

wherein u∈[0,255];

c-5) letting i'=i'+1, taking the next untreated foreground area of the BMap$^{ref}$ as the present foreground area, repeating the step c-2) to the step c-5) again and circularly until all the foreground areas of the BMap$^{ref}$ are treated, wherein the "=" is the assignment symbol; and c-6) calculating the histograms, the normalized histograms and the cumulative histograms of the luminance component Y, the first chroma component Cb and the second chroma component Cr of each the foreground area of the BMap$^{sou}$ by the same method as recited in the step c-1) to the step c-5).

12. The method, as recited in claim 6, wherein the step c) specifically comprises steps of:

c-1) taking the i'th foreground area BMap$_{i'}^{refi}$ under treating of the BMap$^{ref}$ as the present foreground area, wherein, 1≤i'≤I', the I' is the number of the foreground areas of the BMap$^{ref}$;

c-2) calculating the histograms of the luminance component Y, the first chroma component Cb and the second chroma component Cr of the BMap$_{i'}^{refi}$: denoting the histogram of the luminance component Y of the BMap$_{i'}^{refi}$ as H$_{i'}^{Y\_ref}$(u), $$H_{i'}^{Y\_ref}(u) = \sum_{(x',y') \in BMap_{i'}^{ref}} \delta[u, Y(x', y')],$$

wherein Y(x',y') is the value of the luminance component of the pixel at the position of (x',y') in the BMap$_{i'}^{refi}$, $$\delta[u, Y(x', y')] = \begin{cases} 1, & \text{if } u = Y(x', y') \\ 0, & \text{if } u \neq Y(x', y'), \end{cases}$$

denoting the histogram of the first chroma component Cb of the BMap$_{i'}^{refi}$ as H$_{i'}^{Cb\_ref}$(u), $$H_{i'}^{Cb\_ref}(u) = \sum_{(x',y') \in BMap_{i'}^{ref}} \delta[u, Cb(x', y')],$$

wherein Cb(x',y') is the value of the first chroma component of the pixel at the position of (x',y') in the BMap$_{i'}^{refi}$, $$\delta[u, Cb(x', y')] = \begin{cases} 1, & \text{if } u = Cb(x', y') \\ 0, & \text{if } u \neq Cb(x', y'), \end{cases}$$

denoting the histogram of the second chroma component Cr of the BMap$_{i'}^{refi}$ as H$_{i'}^{Cr\_ref}$(u), $$H_{i'}^{Cr\_ref}(u) = \sum_{(x',y') \in BMap_{i'}^{ref}} \delta[u, Cr(x', y')],$$

wherein Cr(x',y') is the value of the second chroma component of the pixel at the position of (x',y') in the BMap$_{i'}^{refi}$, $$\delta[u, Cr(x', y')] = \begin{cases} 1, & \text{if } u = Cr(x', y') \\ 0, & \text{if } u \neq Cr(x', y'), \end{cases}$$

wherein u∈[0,255];

c-3) calculating the normalized histograms of the luminance component Y, the first chroma component Cb and the second chroma component Cr of the BMap$_{i'}^{refi}$: denoting the normalized histogram of the luminance component Y of the BMap$_{i'}^{refi}$ as H$_{i'}^{Y\_Norm\_ref}$(u), H$_{i'}^{Y\_Norm\_ref}$(u)=H$_{i'}^{Y\_ref}$(u)/PixelCount$_{i'}$, denoting the normalized histogram of the first chroma component Cb of the BMap$_{i'}^{refi}$ as H$_{i'}^{Cb\_Norm\_ref}$(u), H$_{i'}^{Cb\_Norm\_hu\ ref}$(u)=H$_{i'}^{Cb\_ref}$(u)/PixelCount$_{i'}$, denoting the normalized histogram of the second chroma component Cr of the BMap$_{i'}^{refi}$ as H$_{i'}^{Cr\_Norm\_ref}$(u), H$_{i'}^{Cr\_Norm\_ref}$(u)= H$_{i'}^{Cr\_ref}$(u)/PixelCount$_{i'}$, wherein u∈[0,255], and the PixelCount$_{i'}$ is the number of the pixels in the present foreground area BMap$_{i'}^{refi}$;

c-4) calculating the cumulative histograms of the luminance component Y, the first chroma component Cb and the second chroma component Cr of the BMap$_{i'}^{refi}$: denoting the cumulative histogram of the luminance component Y of the BMap$_{i'}^{refi}$ as H$_{i'}^{Y\_Cum\_ref}$(u)

$$H_{i'}^{Y\_Cum\_ref}(u) = \sum_{j=0}^{u} H_{i'}^{Y\_Norm\_ref}(j),$$

denoting the cumulative histogram of the first chroma component Cb of the BMap$_{i'}^{refi}$ as H$_{i'}^{Cb\_Cum\_ref}$(u), $$H_{i'}^{Cb\_Cum\_ref}(u) = \sum_{j=0}^{u} H_{i'}^{Cb\_Norm\_ref}(j),$$

denoting the cumulative histogram of the second chroma component Cr of the BMap$_{i'}^{refi}$ as H$_{i'}^{Cr\_Cum\_ref}$(u), $$H_{i'}^{Cr\_Cum\_ref}(u) = \sum_{j=0}^{u} H_{i'}^{Cr\_Norm\_ref}(j),$$

wherein u∈[0,255];

c-5) letting i'=i'+1, taking the next untreated foreground area of the BMap$^{ref}$ as the present foreground area, repeating the step c-2) to the step c-5) again and circularly until all the foreground areas of the BMap$^{ref}$ are treated, wherein the "=" is the assignment symbol; and c-6) calculating the histograms, the normalized histograms and the cumulative histograms of the luminance component Y, the first chroma component Cb and the second chroma component Cr of each the foreground area of the BMap$^{sou}$ by the same method as recited in the step c-1) to the step c-5).

13. The method, as recited in claim 10, wherein the step d) specifically comprises steps of:

d-a1) taking the i'th foreground area $BMap_{i'}^{ref}$ under treating of the $BMap^{ref}$ as the present foreground area, wherein, $1 \leq i' \leq I'$, the I' is the number of the foreground areas of the $BMap^{ref}$;

d-a2) calculating the color histogram of the present foreground area $BMap_{i'}^{ref}$: denoting the color histogram as $H_{i'}^{RGB\_ref}(c)$ $$H_{i'}^{RGB\_ref}(c) = \sum_{(x', y') \in BMap_{i'}^{ref}} \delta[c, C(x', y')] / PixelCount_{i'}^{RGB\_ref},$$

wherein $C = 256 \times R + 16 \times G + B$, the R is the value of a red component of the pixel in the $BMap_{i'}^{ref}$, the G is the value of a green component of the pixel in the $BMap_{i'}^{ref}$, the B is the value of a blue component of the pixel in the $BMap_{i'}^{ref}$, wherein $C(x',y')$ is the value of the C of the pixel at the position of $(x',y')$ in the $BMap_{i'}^{ref}$.

$$\delta[c, C(x', y')] = \begin{cases} 1, & \text{if } c = C(x', y') \\ 0, & \text{if } c \neq C(x', y'), \end{cases}$$

Pixe/$Count_{i'}^{RGB\_ref}$ is the number of the pixels in the present foreground area $BMap_{i'}^{ref}$;

d-a3) letting $i'=i'+1$, taking the next untreated foreground area of the $BMap^{ref}$ as the present foreground area, repeating the step d-a2) to the step d-a3) again and circularly until all the foreground areas of the $BMap^{ref}$ are treated, wherein the "=" is the assignment symbol; and d-a4) calculating the color histogram $H_i^{RGB\_sou}(c)$ of each the foreground area of the $BMap^{sou}$ by the same method as recited in the step d-a1) to the step d-a3).

14. The method, as recited in claim 13, wherein the step e) specifically comprises steps of:

e-1) taking the pth foreground area $BMap_p^{ref}$ under treating of the $BMap^{ref}$ as the first present foreground area, taking the qth foreground area $BMap_q^{sou}$ under treating of the $BMap^{sou}$ as the second present foreground area, wherein, $1 \leq p \leq P$, $1 \leq q \leq Q$, the P is the number of the foreground areas of the $BMap^{ref}$, the Q is the number of the foreground areas of the $BMap^{sou}$;

e-2) calculating the similarity value of the color histogram $H_p^{RGB\_ref}$ of the first foreground area $BMap_p^{ref}$ and the color histogram $H_q^{RGB\_sou}$ of the second foreground area $BMap_q^{sou}$, marking the similarity value as $Sim(H_p^{RGB\_ref}, H_q^{RGB\_sou})$, $0 \leq Sim(H_p^{RGB\_ref}, H_q^{RGB\_sou}) \leq 1$, wherein the larger the value of $Sim(H_p^{RGB\_ref}, H_q^{RGB\_sou})$ is, the more similar the two color histograms are, and the value 1 of $Sim(H_p^{RGB\_ref}, H_q^{RGB\_sou})$ means that the two color histograms are same with each other;

e-3) judging whether $Sim(H_p^{RGB\_ref}, H_q^{RGB\_sou})$ is larger than a threshold $T_s$ or not, if yes, the first foreground area $BMap_p^{ref}$ is matching with the second foreground area $BMap_q^{sou}$, if no, the first foreground area $BMap_p^{ref}$ is not matching with the second foreground area $BMap_q^{sou}$; and e-4) letting $p=p+1$, $q=q+1$, wherein the "=" is the assignment symbol, taking the next untreated foreground area of the $BMap^{ref}$ as the first present foreground area, taking the next untreated foreground area of the $BMap^{sou}$ as the second present foreground area, repeating the step e-2) to the step e-4) again and circularly until all the foreground areas of the $BMap^{ref}$ or the foreground areas of the $BMap^{sou}$ are treated.

15. The method, as recited in claim 14, wherein the step f) specifically comprises steps of:

f-1) taking the matched foreground areas under treating of the $BMap^{ref}$ and the $BMap^{sou}$ respectively as the first present foreground area and the second present foreground area, supposing that the first present foreground area is the p'th matched foreground area $BMap_{p'}^{ref}$ under treating of the $BMap^{ref}$, supposing that the second present foreground area is the q'th matched foreground area $BMap_{q'}^{sou}$ under treating of the $BMap^{sou}$, wherein, $1 \leq p' \leq S$, $1 \leq q' \leq S$, the S is the number of the pairs of the matched foreground areas of the $BMap^{ref}$ and the $BMap^{sou}$;

f-2) judging whether the values u' and u'+1 of the luminance component Y of the first present foreground area $BMap_{p'}^{ref}$ and the value v' of the luminance component Y of the second present foreground area $BMap_{q'}^{sou}$ satisfy a following inequality: $H_{p'}^{Y\_Cum\_ref}(u') \leq H_{q'}^{Y\_Cum\_sou}(v') < H_{p'}^{Y\_Cum\_ref}(u'+1)$, if yes, the value u' of the luminance component Y of the first present foreground area $BMap_{p'}^{ref}$ is matching with the value v' of the luminance component Y of the second present foreground area $BMap_{q'}^{sou}$, calculating a color transfer function of the value v' of the luminance component Y of the second present foreground area $BMap_{q'}^{sou}$, marking the color transfer function as $M_{q'}^{Y}(v')$, wherein $M_{q'}^{Y}(v')=u'$ and then providing a step f-4), if no, providing a step f-3), wherein $H_{p'}^{Y\_Cum\_ref}$ is the cumulative histogram of the luminance component Y of the first present foreground area $BMap_{p'}^{ref}$, $H_{q'}^{Y\_Cum\_sou}$ is the cumulative histogram of the luminance component Y of the second present foreground area $BMap_{q'}^{sou}$;

f-3) letting $u'=u'+1$, repeating the step f-2) for judging the value of the luminance component Y of the first present foreground area $BMap_{p'}^{ref}$ by the inequality, wherein the "=" is the assignment symbol;

f-4) judging whether the values u' and u'+1 of the first chroma component Cb of the first present foreground area $BMap_{p'}^{ref}$ and the value v' of the first chroma component Cb of the second present foreground area $BMap_{q'}^{sou}$ satisfy the following inequality: $H_{p'}^{Cb\_Cum\_ref}(u') \leq H_{q'}^{Cb\_Cum\_sou}(v') < H_{p'}^{Cb\_Cum\_ref}(u'+1)$, if yes, the value u' of the first chroma component Cb of the first present foreground area $BMap_{p'}^{ref}$ is matching with the value v' of the first chroma component Cb of the second present foreground area $BMap_{q'}^{sou}$, calculating the color transfer function of the value v' of the first chroma component Cb of the second present foreground area $BMap_{q'}^{sou}$, marking the color transfer function as $M_{q'}^{Cb}(v')$, wherein $M_{q'}^{Cb}(v')=u'$, and then providing a step f-6), if no, providing a step f-5), wherein $H_{p'}^{Cb\_Cum\_ref}$ is the cumulative histogram of the first chroma component Cb of the first present foreground area $BMap_{p'}^{ref}$, $H_{q'}^{Cb\_Cum\_sou}$ is the cumulative histogram of the first chroma component Cb of the second present foreground area $BMap_{q'}^{sou}$;

f-5) letting $u'=u'+1$, repeating the step f-4) for judging the value of the first chroma component Cb of the first present foreground area $BMap_{p'}^{ref}$ by the inequality, wherein the "=" is the assignment symbol;

f-6) judging whether the values u' and u'+1 of the second chroma component Cr of the first present foreground area $BMap_{p'}^{ref}$ and the value v' of the second chroma component Cr of the second present foreground area $BMap_{q'}^{sou}$ satisfy the following inequality: $H_{p'}^{Cr\_Cum\_ref}(u') \leq H_{q'}^{Cr\_Cum\_sou}(v') < H_{p'}^{Cr\_Cum\_ref}(u'+1)$, if yes, the value u' of the second chroma component Cr of the first present foreground area $BMap_{p'}^{refi}$ is matching with the value v' of the second chroma component Cr of the second present foreground area $BMap_{q'}^{sou}$, calculating the color transfer function of the value v' of the second chroma component Cr of the second present foreground area $BMap_{q'}^{sou}$, marking the color transfer function as $M_{q'}^{Cr}(v')$, wherein $M_{q'}^{Cr}(v')=u'$, and then providing a step f-8), if no, providing a step f-7), wherein $H_{p'}^{Cr\_Cum\_ref}$ is the cumulative histogram of the second chroma component Cr of the first present foreground area $BMap_{p'}^{refi}$, $H_{q'}^{Cr\_Cum\_sou}$ is the cumulative histogram of the second chroma component Cr of the second present foreground area $BMap_{q'}^{sou}$;

f-7) letting u'=u'+1, repeating the step f-6) for judging the value of the second chroma component Cr of the first present foreground area $BMap_{p'}^{refi}$ by the inequality, wherein the "=" is the assignment symbol;

f-8) correcting the color of the corresponding area of the uncorrected image f°" by utilizing the $M_{q'}^{Y}(v')$, $M_{q'}^{Cb}(v')$ and $M_{q'}^{Cr}(v')$ for obtaining the corrected area, marking the luminance component, the first chroma component and the second chroma component of the pixel at the position of (x,y) in the corrected area as $Correct^{Y}(x,y)$, $Correct^{Cb}(x,y)$ and $Correct^{Cr}(x,y)$, wherein $Correct^{Y}(x,y)=M^{Y}(Y^{sou}(x,y))$, $Correct^{Cb}(x,y)=M_{q'}^{Cb}(Cb^{sou}(x,y))$, $Correct^{Cr}(x,y)=M_{q'}^{Cr}(Cr^{sou}(x,y))$, wherein the (x,y) is the coordinate of the pixel in the first present foreground area, the second present foreground area or the corrected area, $Y^{sou}(x,y)$ is the value of the luminance component of the pixel at the position of (x,y) in the second present foreground area, $Cb^{sou}(x,y)$ is the value of the first chroma component of the pixel at the position of (x,y) in the second present foreground area, $Cr^{sou}(x,y)$ is the value of the second chroma component of the pixel at the position of (x,y) in the second present foreground area, $M_{q'}^{Y}(Y^{sou}(x,y))$ is the value of the $Y^{sou}(x,y)$ after being corrected, $M_{q'}^{Cb}(Cb^{sou}(x,y))$ is the value of the $Cb^{sou}(x,y)$ after being corrected, $M_{q'}^{Cr}(Cr^{sou}(x,y))$ is the value of the $Cr^{sou}(x,y)$ after being corrected; and f-9) letting p'=p'+1, q'=q'+1, taking the next untreated foreground area from the matched foreground areas of the $BMap^{ref}$ as the first present foreground area, taking the next untreated foreground area from the matched foreground areas of the $BMap^{sou}$ as the second present foreground area, repeating the step f-2) to the step f-9) again and circularly until all the matched foreground areas of the $BMap^{ref}$ and the $BMap^{sou}$ are treated, wherein the "=" in the equation p'=p'+1 or q'=q'+1 is the assignment symbol.

16. The method, as recited in claim 15, wherein the step g) specifically comprises steps of:

g-1) taking the area comprising all the pixels of the $BMap^{ref}$ with the pixel value of 0 as the background area, calculating the histograms of the luminance component Y, the first chroma component Cb and the second chroma component Cr of the background area of the $BMap^{ref}$: denoting the histogram of the luminance component Y of the background area as $H^{Y\_ref\_back}(u)$, $$H^{Y\_ref\_back}(u) = \sum_{(x',y') \in background} \delta[u, Y^{back}(x', y')],$$

wherein $Y^{back}(x,y)$ is the value of the luminance component of the pixel at the position of (x',y') in the background area, δ, $$\delta[u, Y^{back}(x', y')] = \begin{cases} 1, & \text{if } u = Y^{back}(x', y') \\ 0, & \text{otherwise,} \end{cases}$$

denoting the histogram of the first chroma component Cb of the background area as $H^{Cb\_ref\_back}(u)$, $$H^{Cb\_ref\_back}(u) = \sum_{(x',y') \in background} \delta[u, Cb^{back}(x', y')],$$

wherein $Cb^{back}(x',y')$ is the value of the first chroma component of the pixel at the position of (x',y') in the background area, $$\delta[u, Cb^{back}(x', y')] = \begin{cases} 1, & \text{if } u = Cb^{back}(x', y') \\ 0, & \text{otherwise,} \end{cases}$$

denoting the histogram of the second chroma component Cr of the background area as $H^{Cr\_ref\_back}(u)$, $$H^{Cr\_ref\_back}(u) = \sum_{(x',y') \in background} \delta[u, Cr^{back}(x', y')],$$

wherein $Cr^{back}(x',y')$ is the value of the second chroma component of the pixel at the position of (x',y') in the background area, $$\delta[u, Cr^{back}(x', y')] = \begin{cases} 1, & \text{if } u = Cr^{back}(x', y') \\ 0, & \text{otherwise,} \end{cases}$$

wherein $u \in [0,255]$;

g-2) calculating the normalized histograms of the luminance component Y, the first chroma component Cb and the second chroma component Cr of the background area: denoting the normalized histogram of the luminance component Y of the background area as $H^{Y\_Norm\_ref\_back}(u)$, $H^{Y\_Norm\_ref\_back}(u)=H^{Y\_ref\_back}(u)/PiXelCount^{back}$, denoting the normalized histogram of the first chroma component Cb of the background area as $H^{Cb\_Norm\_ref\_back}(u)$, $H^{Cb\_Norm\_ref\_back}(u)=H^{Cb\_ref\_back}(u)/PixelCount^{back}$, denoting the normalized histogram of the second chroma component Cr of the background area as $H^{Cr\_Norm\_ref\_back}(u)$, $H^{Cr\_Norm\_ref\_back}(u) \leq H^{Cr\_ref\_back}(u)/PixelCount^{back}$, wherein $u \in [0,255]$, and the $PixelCount^{back}$ is the number of all the pixels in the background area;

g-3) calculating the cumulative histograms of the luminance component Y, the first chroma component Cb and the second chroma component Cr of the background area: denoting the cumulative histogram of the luminance component Y of the background area as $H^{Y\_Cum\_ref\_back}(u)$, $$H^{Y\_Cum\_ref\_back}(u) = \sum_{j=0}^{u} H^{Y\_Norm\_ref\_back}(j),$$

denoting the cumulative histogram of the first chroma component Cb of the background area as $H^{Cb\_Cum\_ref\_back}(u)$, $$H^{Cb\_Cum\_ref\_back}(u) = \sum_{j=0}^{u} H^{Cb\_Norm\_ref\_back}(j),$$

denoting the cumulative histogram of the second chroma component Cr of the background area as $H^{Cr\_Cum\_ref\_back}(u)$, $$H^{Cr\_Cum\_ref\_back}(u) = \sum_{j=0}^{u} H^{Cr\_Norm\_ref\_back}(j),$$

wherein u∈[0,255]; and g-4) calculating the histograms, the normalized histograms and the cumulative histograms of the luminance component Y, the first chroma component Cb and the second chroma component Cr of the background area of the BMap$^{sou}$ by the same method as recited in step g-1) to step g-3).

17. The method, as recited in claim 16, wherein the step h) specifically comprises steps of:

h-1) judging whether the values u' and u'+1 of the luminance component Y of the background area of the BMap$^{ref}$ and the value v' of the luminance component Y of the background area of the BMap$^{sou}$ satisfy the following inequality: $H^{Y\_Cum\_ref\_back}(u') \leq H^{Y\_Cum\_sou\_back}(v') < H^{Y\_Cum\_ref\_back}(u'+1)$, if yes, the value u of the luminance component Y of the background area of the BMap$^{ref}$ is matching with the value v' of the luminance component Y of the background area of the BMap$^{sou}$, calculating the color transfer function of the value v' of the luminance component Y of the background area of the BMap$^{sou}$, marking the color transfer function as $M^{Y\_back}(v')$ wherein $M^{Y\_back}(v')=u'$, and then providing a step h-3), if no, providing a step h-2), wherein $H^{Y\_Cum\_ref\_back}$ is the cumulative histogram of the luminance component Y of the background area of the BMap$^{ref}$, $H^{Y\_Cum\_sou\_back}$ is the cumulative histogram of the luminance component Y of the background area of the BMap$^{sou}$;

h-2) letting u'=u'+1, repeating the step h-1) for judging the value of the luminance component Y of the background area of the BMap$^{ref}$ by the inequality, wherein the "=" is the assignment symbol;

h-3) judging whether the values u' and u'+1 of the first chroma component Cb of the background area of the BMap$^{ref}$ and the value v' of the first chroma component Cb of the background area of the BMap$^{sou}$ satisfy the following inequality: $H^{Cb\_Cum\_ref\_back}(u') < H^{Cb\_Cum\_sou\_back}(v') < H^{Cb\_Cum\_ref\_back}(u'+1)$, if yes, the value u' of the first chroma component Cb of the background area of the BMap$^{ref}$ is matching with the value v' of the first chroma component Cb of the background area of the BMap$^{sou}$, calculating the color transfer function of the value v' of the first chroma component Cb of the background area of the BMap$^{sou}$ marking the color transfer function as $M^{Cb\_back}(v')$ wherein $M^{Cb\_back}(v')=u'$, and then providing a step h-5), if no, providing a step h-4), wherein $H^{Cb\_Cum\_ref\_back}$ is the cumulative histogram of the first chroma component Cb of the background area of the BMap$^{ref}$, $H^{Cb\_Cum\_sou\_back}$ is the cumulative histogram of the first chroma component Cb of the background area of the BMap$^{sou}$;

h-4) letting u'=u'+1, repeating the step h-3) for judging the value of the first chroma component Cb of the background area of the BMap$^{ref}$ by the inequality, wherein the "=" is the assignment symbol;

h-5) judging whether the values u' and u'+1 of the second chroma component Cr of the background area of the BMap$^{ref}$ and the value v' of the second chroma component Cr of the background area of the BMap$^{sou}$ satisfy the following inequality: $H^{Cr\_Cum\_ref\_back}(u') \leq H^{Cr\_Cum\_sou\_back}(v') < H^{Cr\_Cum\_ref\_back}(u'+1)$ if yes, the value u' of the second chroma component Cr of the background area of the BMap$^{ref}$ is matching with the value v' of the second chroma component Cr of the background area of the BMap$^{sou}$, calculating the color transfer function of the value v' of the second chroma component Cr of the background area of the BMap$^{sou}$, marking the color transfer function as $M^{Cr\_back}(v)$ wherein $M^{Cr\_back}(v')=u'$, and then providing a step h-7), if no, providing a step h-6), wherein $H^{Cr\_Cum\_ref\_back}$ is the cumulative histogram of the second chroma component Cr of the background area of the BMap$^{ref}$, $H^{Cr\_Cum\_sou\_back}$ is the cumulative histogram of the second chroma component Cr of the background area of the BMap$^{sou}$;

h-6) letting u'=u'+1, repeating the step h-5) for judging the value of the second chroma component Cr of the background area of the BMap$^{ref}$ by the inequality, wherein the "=" is the assignment symbol; and h-7) correcting the color of the corresponding area of the uncorrected image $I^{sou}$ by utilizing the $M^{Y\_back}(v')$, $M^{Cb\_back}(v')$ and $M^{Cr\_back}(v')$ for obtaining the corrected background area, marking the luminance component, the first chroma component and the second chroma component of the pixel at the position of (x,y) in the corrected background area as Correct$^{Y\_back}$(x,y), Correct$^{Cb\_back}$(x,y) and Correct$^{Cr\_back}$(x,y) wherein, Correct$^{Y\_back}$(x,y)=$M^{Y\_back}(Y^{sou\_back}(x,y))$, Correct$^{Cb\_back}$(x,y)=$M^{Cb\_back}(Cb^{sou\_back}(x,y))$, Correct$^{Cr\_back}$(x,y)=$M^{Cr\_back}(x,y)$) wherein the (x,y) is the coordinate of the pixel in the background area of the BMap$^{ref}$, the background area of the BMap$^{sou}$ or the corrected background area, $Y^{sou\_back}$(x,y) is the value of the luminance component of the pixel at the position of (x,y) in the background area of the BMap$^{sou}$, Cb$^{sou\_back}$(x,y) is the value of the first chroma component of the pixel at the position of (x,y) in the background area of the BMap$^{sou}$, Cr$^{sou\_back}$(x,y) is the value of the second chroma component of the pixel at the position of (x,y) in the background area of the BMap$^{sou}$, $M^{Y\_back}(Y^{sou\_back}(x,y))$ is the value of the $Y^{sou\_back}$(x,y) after being corrected, $M^{Cb\_back}(Cb^{sou\_back}(x,y))$ is the value of the Cb$^{sou\_back}$(x,y) after being corrected, $M^{Cr\_back}(Cr^{sou\_back}(x,y))$ is the value of the Cr$^{sou\_back}$(x,y) after being corrected.

* * * * *